United States Patent [19]
Ando

[11] Patent Number: 6,137,946
[45] Date of Patent: Oct. 24, 2000

[54] PICTURE EDITING APPARATUS AND METHOD USING VIRTUAL BUFFER ESTIMATION

[75] Inventor: Yuji Ando, Kanagawa, Japan

[73] Assignee: Sony Corporation, Tokyo, Japan

[21] Appl. No.: 09/054,858

[22] Filed: Apr. 3, 1998

[30] Foreign Application Priority Data

Apr. 4, 1997 [JP] Japan ................................. 9-086251

[51] Int. Cl.[7] .................................................... H04N 5/76
[52] U.S. Cl. ............................................. 386/52; 386/111
[58] Field of Search ................................ 386/46, 52, 95, 386/96, 98, 111, 112; 348/584, 473; 370/487; 345/328; H04N 5/76

[56] References Cited

U.S. PATENT DOCUMENTS

| | | | |
|---|---|---|---|
| 5,534,944 | 7/1996 | Egawa et al. ............................ | 348/584 |
| 5,706,386 | 1/1998 | Miyazawa ................................. | 386/52 |
| 5,917,830 | 6/1999 | Chen et al. .............................. | 370/487 |

*Primary Examiner*—Huy Nguyen
*Attorney, Agent, or Firm*—Limbach & Limbach, LLP

[57] ABSTRACT

A bit stream C is composed in editing work at a high processing speed wherein at least a portion of a bit stream A resulting from MPEG encoding is concatenated with at least a portion of a bit stream B also resulting from MPEG encoding. The amount of data $D_A$ at an end point $A_{out}$ of a scene A' of the bit stream A and the amount of data $D_B$ at a start point $B_{in}$ of a scene B' of the bit stream B to be accumulated in a VBV buffer are calculated. The difference between $D_A$ and $D_B$ is used for adjusting the amount of data at a portion of the bit stream C which corresponds to a point of junction between the bit streams A and B. If $D_A > D_B$, stuffing code is added to a picture at the end point $A_{out}$. If $D_A < D_B$, on the other hand, skipped P pictures are inserted into a location after the picture at the end point $A_{out}$.

7 Claims, 14 Drawing Sheets

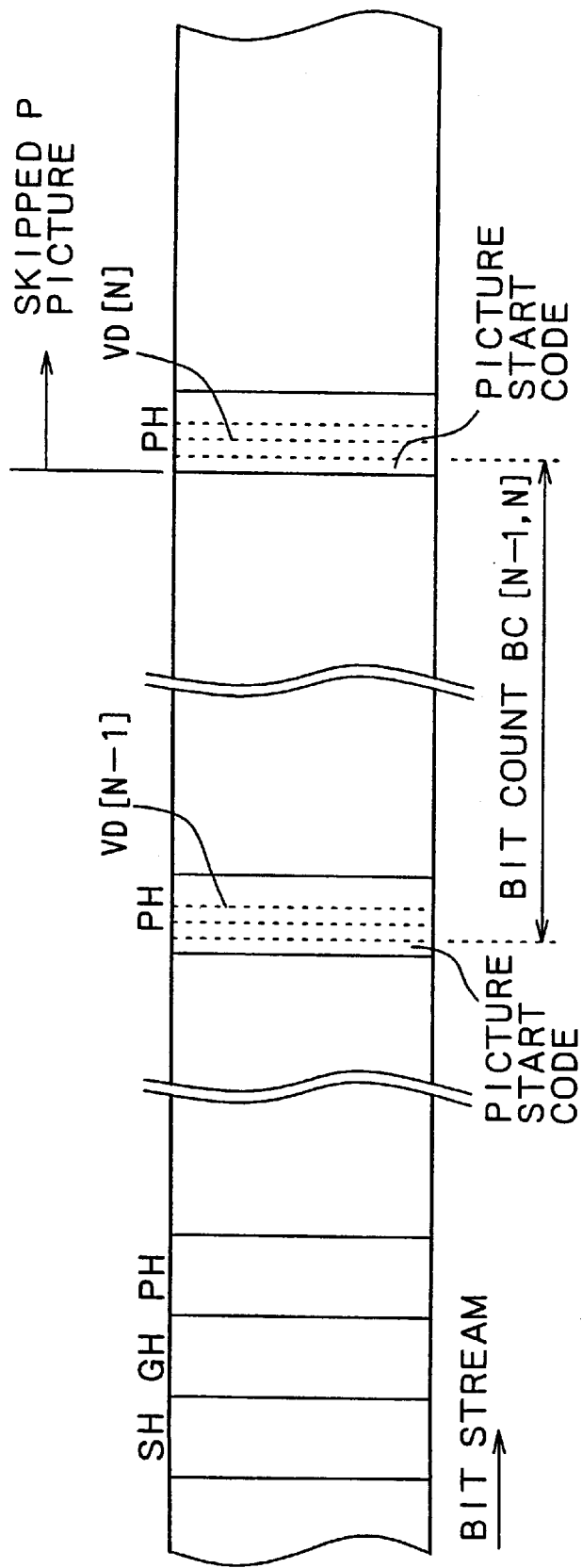

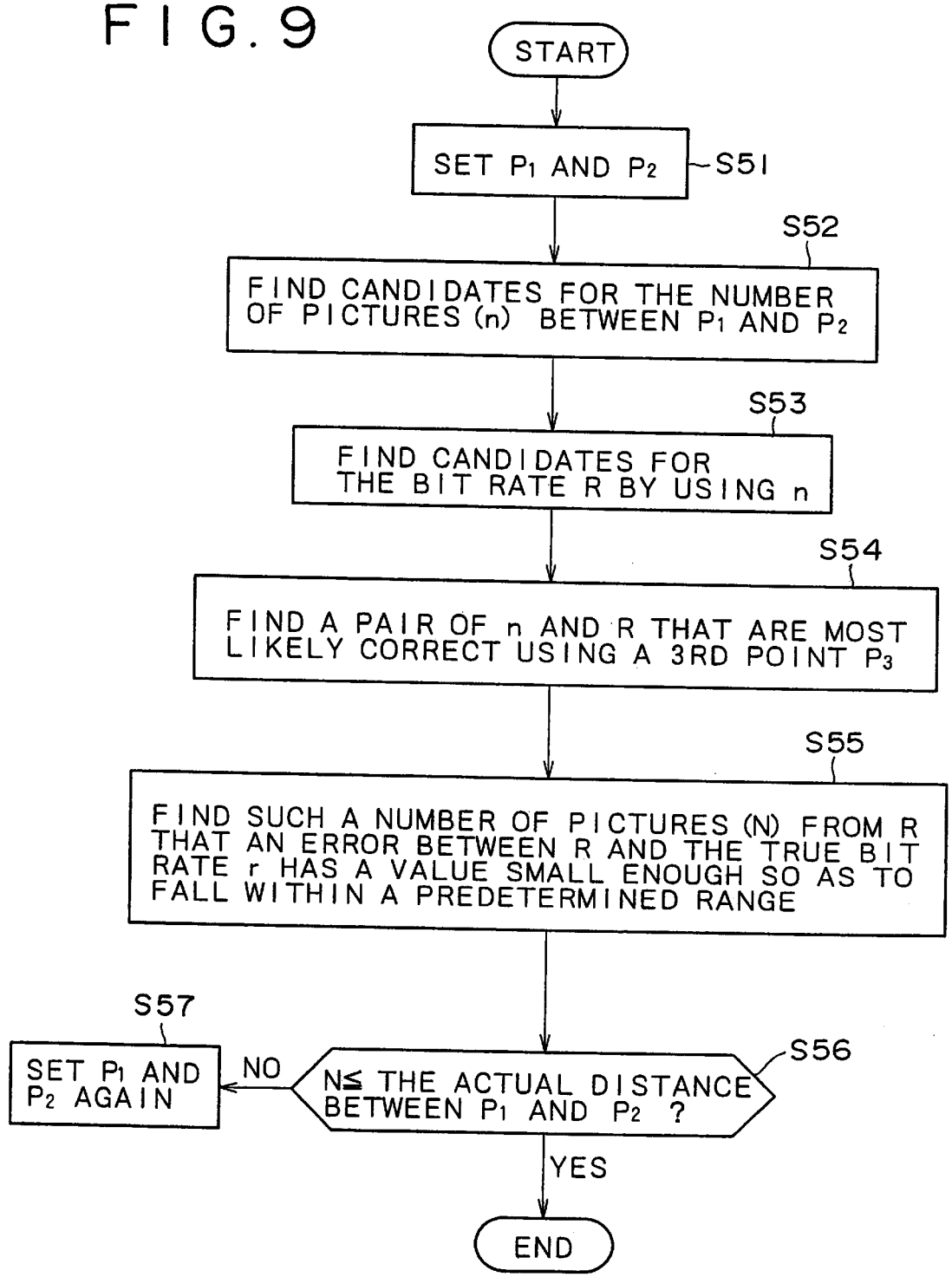

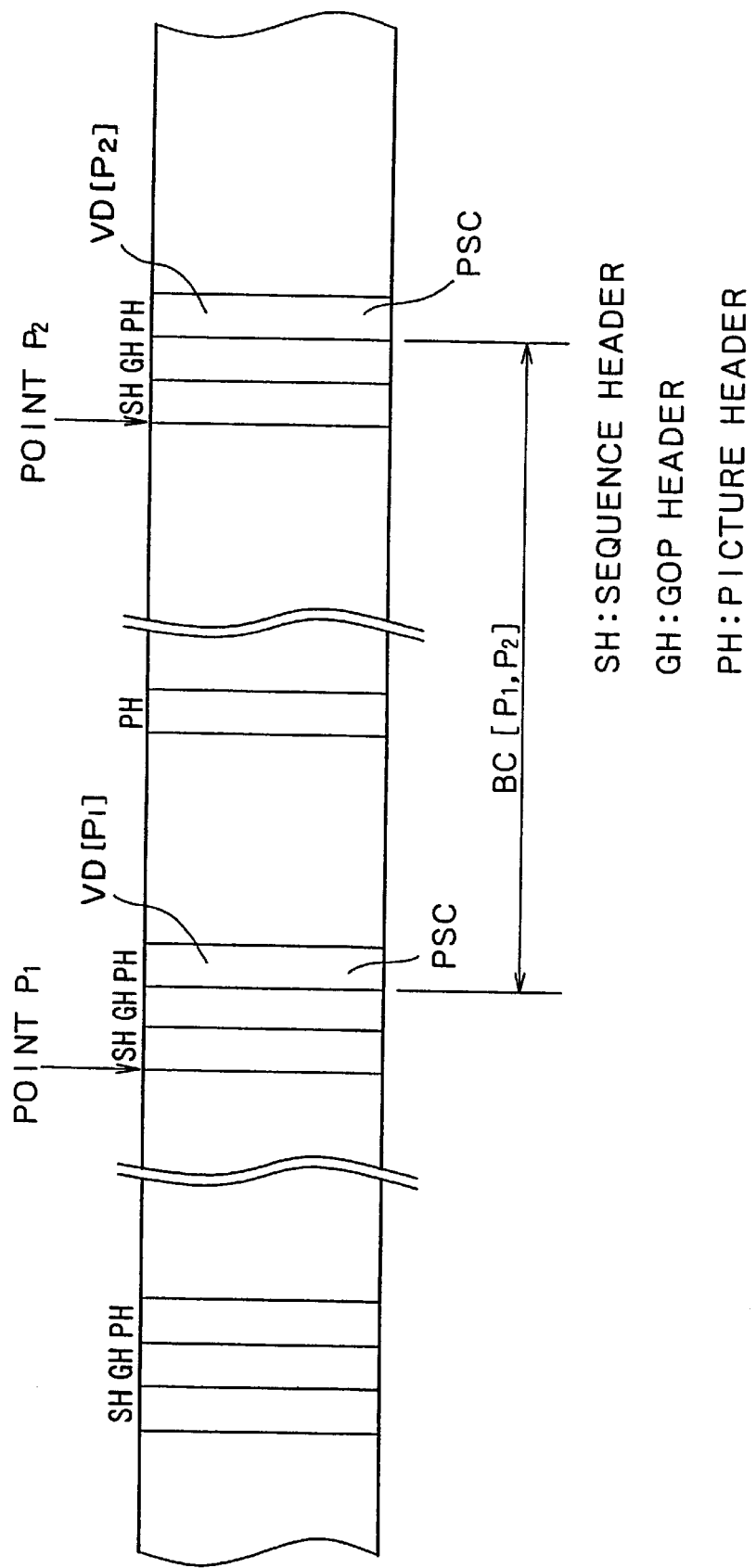

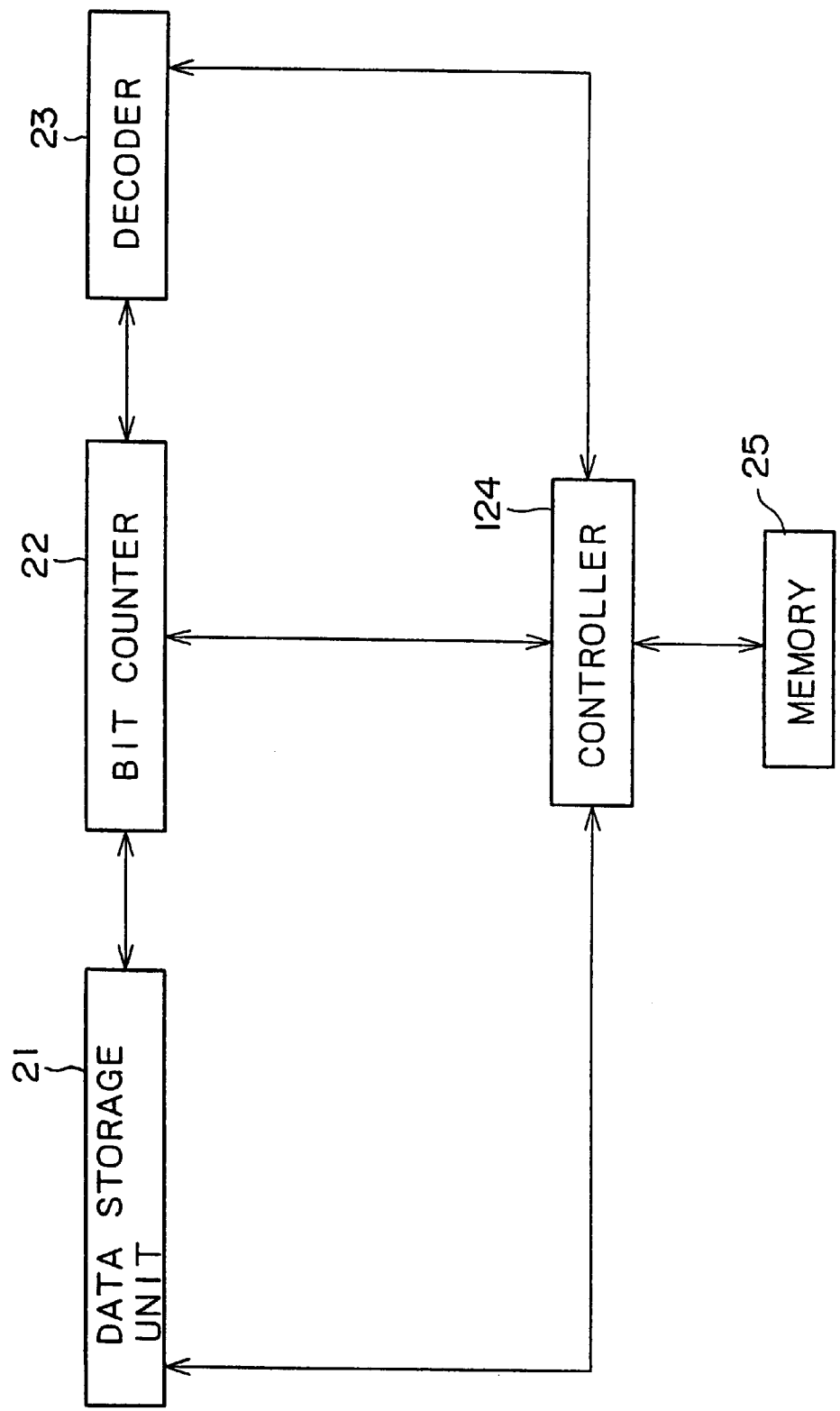
FIG. II (PRIOR ART)

PICTURE EDITING APPARATUS AND METHOD USING VIRTUAL BUFFER ESTIMATION

BACKGROUND OF THE INVENTION

In general, the present invention relates to a picture editing apparatus and a picture editing method. More particularly, the present invention relates to an excellent picture editing apparatus and an excellent picture editing method used for example for carrying out the so-called cut/edit processing on a bit stream typically obtained from an MPEG encoding operation of a picture.

FIG. 11 is a block diagram showing a typical configuration of the conventional picture editing apparatus.

Implemented typically by a hard disc, a data storage unit 21 employed in the picture editing apparatus shown in the figure is used for storing bit streams A and B as objects to be edited. The bit streams A and B have been compressed in conformity with the ISO-11172-2 specifications or the so-called MPEG1 specifications. The data storage unit 21 is also used for storing, among other data, a continuous bit stream C resulting from editing of the bit streams A and B in accordance with commands issued by a controller 124. To put it in detail, the bit stream C is a result of concatenation of at least a portion extracted from the bit stream A and at least a portion from the bit stream B with each other.

A bit counter 22 is used for counting the number of bits included in a bit stream output from the data storage unit 21. The number of bits included in a bit stream is used for expressing the size of the bit stream. The number of bits is supplied to the controller 124 at a request made by the controller 124. In addition, the bit counter 22 also passes on a bit stream received from the data storage unit 21 to a decoder 23 as it is. Controlled by the controller 124, the decoder 23 decodes a variety of parameters included in a bit stream supplied thereto from the data storage unit 21 by way of the bit counter 22 and outputs results of the decoding to the controller 124. To put it in detail, the decoder 23 is used for decoding headers included in a bit stream such as a sequence header, a GOP header, that is, the header of a GOP (Group of Pictures), and a picture header, supplying information recorded in the headers to the controller 124.

On the basis of data output by the bit counter 22 and the decoder 23, the controller 124 composes a bit stream C from the bits streams A and B stored in the data storage unit 21 by using a memory unit 25 if necessary and stores the bit stream C in the storage unit 21.

The operation of the picture editing apparatus to compose the bit stream C is explained as follows.

Assume that the bit stream C is composed by concatenating a scene A' extracted from the bit stream A with a scene B' cut out from the bit stream B with the scenes A' and B' serving as the front and rear halves of the concatenation respectively as shown in FIG. 12.

Also assume that the start and end points of the scene A' are $A_{in}$ and $A_{out}$ respectively whereas the start and end points of the scene B' are $B_{in}$ and $B_{out}$ respectively.

According to the MPEG1 specifications, a bit stream shall be edited in GOP units. Thus, the start points $A_{in}$ and $B_{in}$ are each set in advance to point to a head picture of a GOP while the end points $A_{out}$ and $B_{out}$ are each set in advance to point to a tail picture of a GOP.

In order to detect the start points $A_{in}$ and $B_{in}$ as well as the end points $A_{out}$ and $B_{out}$, it is therefore necessary to detect their GOPs. A GOP is normally detected by recognition of a GSC (Group Start Code) placed at the head of the GOP. In the case of the last GOP at the end of the bit stream A with no GOP following it, the end point $A_{out}$ thereof is detected by assuming that another GOP follows the last GOP of the bit stream A. By the same token, for the last GOP of the bit stream B, the end point $B_{out}$ thereof is detected by assuming that another GOP follows the last GOP.

FIG. 13 is a flowchart representing operations carried out by the picture editing apparatus to concatenate the scene A' with the scene B'. As shown in the figure, the flowchart begins with a step S101 at which sequence headers are read out from the bit streams A and B. To put it in detail, the controller 124 controls the data storage unit 21 so as to supply the bit stream A to the decoder 23 by way of the bit counter 22. The decoder 23 then decodes the sequence header of the bit stream A. Subsequently, the same operations are carried out on the bit stream B.

The decoded contents of the sequence headers of the bit streams A and B are supplied to the memory unit 25 by way of the controller 124 to be stored therein.

Then, the flow of the processing goes on to a step S102 at which the controller 124 compares the sequence header of the bit stream A stored in the memory unit 25 with that of the bit stream B in order to form a judgment as to whether or not cut/edit processing can be carried out on the bit streams A and B to compose a bit stream C. To put it in detail, if parameters up to a LIQM (Load Intra Quantize Matrix) parameter of the sequence header of the bit stream A do not agree with those of the bit stream B, the cut/edit processing can not be carried out. Thus, at the step S102, the parameters of the bit stream A are compared with those of the bit stream B to determine whether or not the cut/edit processing can be carried out.

If the outcome of the judgment formed at the step S102 indicates that the cut/edit processing can not be carried on the bit streams A and B, that is, if even only one of the parameters up to the LIQM parameter of the sequence header of the bit stream A does not agree with the corresponding parameter of the bit stream B, the controller 124 displays a message indicating that the processing can not be carried out on a monitor not shown in the figure and terminates the processing.

If the outcome of the judgment formed at the step S102 indicates that the cut/edit processing can be carried on the bit streams A and B, that is, if the parameters up to the LIQM parameter of the sequence header of the bit stream A all agree with the corresponding ones of the bit stream B, on the other hand, the flow of the processing continues to a step S103 at which the controller 124 starts an operation to read out the bit stream A from the data storage unit 21 typically in picture units, supplying the bit stream A to the decoder 23 by way of the bit counter 22.

In the bit counter 22, the number of bits included in the bit stream A representing the size of the bit stream A is counted whereas, in the decoder 23, the sequence header of the bit stream A, if any, is decoded. Results of the counting and the decoding are both supplied to the controller 124. Then, the flow of the processing proceeds to a step S104 at which the controller 124 forms a judgment as to whether or not a sequence header was output from the data storage unit 21 by monitoring the result of the decoding supplied thereto by the decoder 23. If the outcome of the judgment formed at the step S104 indicates that a sequence header was output, the flow of the processing continues to a step S105 at which the most recent sequence header supplied by the decoder 23 is used to update an existing sequence header for the bit stream A stored in the memory unit 25. The flow of the processing then goes on to a step S106.

If the outcome of the judgment formed at the step S104 indicates that a sequence header was not output, on the other hand, the flow of the processing continues directly to the step S106 by skipping the S105. At the step S106, the controller 124 forms a judgment as to whether or not a picture at the start point $A_{in}$ was read out from the data storage unit 21. If the outcome of the judgment formed at the step S106 indicates that a picture at the start point $A_{in}$ has not been read out yet, the flow of the processing returns to the step S103 at which the controller 124 continues the operation to read out the bit stream A from the data storage unit 21.

If the outcome of the judgment formed at the step S106 indicates that a picture at the start point $A_{in}$ has been read out, on the other hand, the flow of the processing proceeds to a step S107 at which the controller 124 stores the most recent sequence header of the bit stream A stored in the memory unit 25 in the data storage unit 21 as the first sequence header of a bit stream C currently being composed. The flow of the processing then goes on to a step S108. At the step S108, the controller 124 reads out data of the GOP header of a GOP, to which the picture at the start point $A_{in}$ pertains, from the data storage unit 21. The controller 124 then requests the decoder 23 to decode the data and receives a result of the decoding from the decoder 23.

Then, the flow of the processing continues to a step S109 at which the controller 124 forms a judgment as to whether or not a CG (closed GOP) field included in the GOP header received from the decoder 23 is 0. If the outcome of the judgment formed at the step S109 indicates that the CG field is 0, that is, if the GOP is a so-called open GOP, the flow of the processing goes on to a step S110 at which a BL (Broken Link) field included in the GOP header is set at 1. The flow of the processing then proceeds to a step S112.

This is because, if the current GOP including a picture at the start point $A_{in}$ is an open GOP, the link to the immediately preceding GOP is broken by the edit processing making it impossible to correctly decode a first B picture in the display order of the current GOP in a playback operation. That is why the BL field is set at 1 to indicate the fact that the link to the immediately preceding GOP is broken.

If the outcome of the judgment formed at the step S109 indicates that the CG field is not 0, that is, if the GOP is a so-called closed GOP, on the other hand, the flow of the processing goes on to a step S111 at which the BL (Broken Link) field included in the GOP header is set at 0. The flow of the processing then proceeds to the step S112.

This is because, if the current GOP including a picture at the start point $A_{in}$ is a closed GOP, the first picture of the current GOP is an I picture or a B picture requiring no forward direction prediction. In either case, the immediately preceding GOP is not required in the decoding of the picture. That is why the BL field is set at 0.

At the step S112, the controller 124 stores the GOP header with the BL field thereof set at the step S110 or S111 as a GOP header of the bit stream C in the data storage unit 21 following the sequence header stored at the step S107. The flow of the processing then goes on to a step S113.

At the step S113, the controller 124 continues the operation to read out the bit stream A from the data storage unit 21. Then, the flow of the processing proceeds to a step S114 at which the controller 124 forms a judgment as to whether or not a picture at the end point $A_{out}$ has been read out from the data storage unit 21. If the outcome of the judgment formed at the step S114 indicates that a picture at the end point $A_{out}$ has not been read out, the flow of the processing continues to a step S115 at which data read out at the step S113 is stored in the data storage unit 21 as data of the bit stream C.

Subsequently, the flow of the processing goes on to a step S116 at which the controller 124 forms a judgment as to whether or not the data read out at the step S113 is a sequence header. If the outcome of the judgment formed at the step S116 indicates that the data read out at the step S113 is a sequence header, the flow of the processing continues to a step S117 at which the most recent sequence header supplied by the decoder 23, that is, the data read out at the step S113, is used to update an existing sequence header for the bit stream A stored in the memory unit 25. The most recent sequence header of the bit stream A will be compared with the sequence header of the bit stream B at a step S128 to be described later. The flow of the processing returns to a step S113 at which the controller 124 continues the operation to read out the bit stream A from the data storage unit 21.

If the outcome of the judgment formed at the step S116 indicates that the data read out at the step S113 is not a sequence header, on the other hand, the flow of the processing returns directly to the step S113 to continue the operation to read out the bit stream A from the data storage unit 21 by skipping the step S117.

If the outcome of the judgment formed at the step S114 indicates that a picture at the end point $A_{out}$ has been read out, on the other hand, the flow of the processing continues to a step S121 shown in FIG. 14, a diagram showing the continuation to the flowchart shown in FIG. 13. At the step S121, data read out at the step S113 is stored in the data storage unit 21 as data of the bit stream C. The flow of the processing then goes on to a step S122 at which the controller 124 continues the operation to read out the bit stream A from the data storage unit 21. Then, the flow of the processing proceeds to a step S123 at which the controller 124 forms a judgment as to whether or not data read out at the step S122 is either a sequence header, a GOP header or an SEC (Sequence End of Code) by referring to an output of the decoder 23.

If the outcome of the judgment formed at the step S123 indicates that the data read out at the step S122 is neither a sequence header, a GOP header nor an SEC, the flow of the processing returns to the step S121 to repeat the processing carried out at the steps S121 to S123.

If the outcome of the judgment formed at the step S123 indicates that the data read out at the step S122 is either a sequence header, a GOP header or an SEC, on the other hand, the flow of the processing goes on to the step S124 without storing the data in the data storage unit 21. At the step S124, the controller 124 starts an operation to read out the bit stream B from the data storage unit 21 typically in picture units.

Then, the flow of the processing proceeds to a step S125 at which the controller 124 forms a judgment as to whether or not data read out at the step S124 is a sequence header by referring to an output of the decoder 23. If the outcome of the judgment formed at the step S125 indicates that a sequence header was read out, the flow of the processing continues to a step S126 at which the most recent sequence header supplied by the decoder 23 is used to update an existing sequence header for the bit stream B stored in the memory unit 25. The flow of the processing then goes on to a step S127.

If the outcome of the judgment formed at the step S125 indicates that the data read out at the step S124 is not a sequence header, on the other hand, the flow of the processing continues directly to the step S127 by skipping the S126. At the step S127, the controller 124 forms a judgment as to whether or not a picture at the start point $B_{in}$ was read out from the data storage unit 21. If the outcome of the judgment formed at the step S127 indicates that a picture at the start point $B_{in}$ has not been read out yet, the flow of the processing returns to the step S124 at which the controller 124 continues the operation to read out the bit stream B from the data storage unit 21.

If the outcome of the judgment formed at the step S127 indicates that a picture at the start point $B_{in}$ has been read out, on the other hand, the flow of the processing proceeds to a step S128 at which the controller 124 compares the most recent sequence headers of the bit streams A and B stored in the memory unit 25 with each other to form a judgment as to whether or not the LIQM parameters of the sequence headers match each other and as to whether or not the LNIQM (Load Non Intra Quantizer Matrix) parameters of the sequence headers agree with each other.

If the outcome of the judgment formed at the step S128 indicates that the LIQM and/or the LNIQM parameters of the most recent sequence headers do not agree with each other, the flow of the processing goes on to a step S129 at which the controller 124 stores the most recent sequence header for the bit stream B stored in the memory unit 25 in the data storage unit 21 as a sequence header of the bit stream C currently being composed. The flow of the processing then proceeds to a step S130.

If the outcome of the judgment formed at the step S128 indicates that the LIQM and the LNIQM parameters of the most recent sequence headers agree with each other, on the other hand, the flow of the processing directly goes on to the step S130 by skipping the step S129. At the step S130, the controller 124 computes a VD (VBV Delay) for a picture of the start point $B_{in}$ read out at the step S124. The VD represents the amount of data to be accumulated in a VBV (video Buffering Verifier) buffer assumed to exist on the receiving side, that is, on the decoder side, as prescribed in the MPEG specifications.

The VD and its computation at the step S130 will be described more later.

Then, the flow of the processing proceeds to a step S131 at which the controller 124 forms a judgment as to whether a value of the VD computed at the step S130 is proper or improper, the meanings of which will be described more later. An outcome of the judgment formed at the step S131 showing an improper value of the VD computed at the step S130 indicates that the bit streams A and B can not be edited prior to MPEG decoding. In this case, the processing is thus terminated.

If the outcome of the judgment formed at the step S131 indicates that the value of the VD computed at the step S130 is not improper, on the other hand, the flow of the processing goes on to a step S132 at which the value of the VD computed at the step S130 is written over a VD field in the picture header of the picture of the start point by read out at the step S124. The flow of the processing then continues to a step S133 at which the picture with the VD thereof updated at the step S132, that is, the picture of the start point $B_{in}$ read out at the step S124 in this case, is stored in the data storage unit 21 as data of the bit stream C being composed.

Then, the flow of the processing proceeds to a step S134 at which the controller 124 continues the operation to read out the bit stream B from the data storage unit 21. Subsequently, the flow of the processing proceeds to a step S135 at which the controller 124 forms a judgment as to whether or not a picture at the end point $B_{out}$ has been read out from the data storage unit 21. If the outcome of the judgment formed at the step S135 indicates that a picture at the end point $B_{out}$ has not been read out at the step S134, the flow of the processing returns to a step S130 to repeat the processing carried out at the steps S130 to S135.

To be more specific, at the step S130, the controller 124 computes a VD, which represents to the amount of data to be accumulated in the VBV buffer, for a picture read out at the step S134. Then, the flow of the processing proceeds to the step S131 at which the controller 124 forms a judgment as to whether a value of the VD computed at the step S130 is proper or improper. If the outcome of the judgment formed at the step S131 indicates that value of the VD computed at the step S130 is improper, the processing is terminated. If the outcome of the judgment formed at the step S131 indicates that the value of the VD computed at the step S130 is not improper, on the other hand, the flow of the processing goes on to the step S132 at which the value of the VD computed at the step S130 is written over a VD field in the picture header of the picture read out at the step S134. The flow of the processing then continues to the step S133 at which the picture with the VD thereof updated at the step S132, that is, the picture read out at the step S134 in this case, is stored in the data storage unit 21 as data of the bit stream C being composed.

If the outcome of the judgment formed at the step S135 indicates that a picture at the end point $B_{out}$ has been read out at the step S134, on the other hand, the flow of the processing goes on to a step S136 at which the controller 124 stores the picture, that is, the picture of the end point $B_{out}$ read out at the step S134 in this case, in the data storage unit 21 as data of the bit stream C being composed. It should be noted that the processing carried out at the step S136 includes the pieces of processing carried out at the steps S130 to S132, that is, the computation of a value of the VD, the formation of the judgment as to whether the computed value of the VD is proper or improper and the updating of the VD field in the picture header in the case of a proper computed value of the VD.

Later on, the flow of the processing proceeds to a step S137 at which an SEC is stored as last data of the bit stream C being composed and the processing is terminated.

By the way, the MPEG specifications prescribe that a bit stream shall be composed so that neither an overflow nor an underflow will occur in the VBV buffer.

FIG. 15 is a diagram showing changes of the amount of data accumulated in the VBV buffer. It should be noted that the horizontal and vertical axes of the diagram represent time and the amount of accumulated data respectively.

The VBV buffer is used for accumulating a bit stream resulting from MPEG encoding at a predetermined fixed bit rate. A sequence header of a bit stream includes a BR (Bit Rate), a value resulting from division of the fixed bit rate expressed in terms of bps (bits per second) by 400 with fraction part of the value rounded up.

A bit stream is read out from the VBV buffer to be supplied to a decoding unit in accordance with a PR (Picture Rate) included in the sequence header of the bit stream. To put it in detail, at each of decoding times which occur at fixed intervals determined by the PR, data of a picture to be decoded at the decoding time is read out instantaneously from the VBV buffer and supplied to the decoding unit.

Thus, during a period between an operation to read out a picture from the VBV buffer and an operation to read out a next picture, data of the amount of a bit rate/a picture rate is accumulated in the VBV buffer. Notation $D_1$ shown in FIG. 15 represents the amount of data equal to a bit rate/a picture rate.

At a decoding time, data starting with a first bit of an SHC (Sequence Header Code), a GSC (Group Start Code) or a PSC (Picture Start Code) and ending with a bit immediately preceding the next SHC, the next GSC or the next PSC is read out instantaneously from the VBV buffer. The SHC is a code indicating the start of a sequence header. According to the MPEG1 specifications, the SHC has a hexadecimal value of 000001B3. On the other hand, the GSC is a code indicating the start of a GOP header. According to the MPEG1 specifications, the GSC has a hexadecimal value of 000001B8. Finally, the PSC is a code indicating the start of a picture header. According to the MPEG1 specifications, the PSC has a hexadecimal value of 00000100. It should be noted that notation $D_1$ shown in FIG. 15 represents the amount of data starting with a first bit of an SHC and ending with a bit immediately preceding the next SHC.

The amount of data accumulated in the VBV buffer can be recognized from the VD included in a picture header. The VD expresses the number of clock pulses with a frequency of 90 KHz resulting from measurement of the length of a time expressed in terms of clock pulses. The time is a period of time it takes to restore the amount of data accumulated in the VBV buffer in a process to accumulate data in the VBV buffer at a bit rate indicated by the BR following an operation to read out data up to the last bit of a PSC from the VBV buffer to a value prior to the read operation.

In an edit operation described above, normally, there is a gap representing a difference between the amount of data accumulated in the VBV buffer at the end point $A_{out}$ of the bit stream A and the amount of data accumulated in the VBV buffer at the start point $B_{in}$ of the bit stream B as shown in FIG. 16, a diagram showing a mismatch of the amount of data accumulated in the VBV buffer which is resulted in when the scene A' of the bit stream A is concatenated with the scene B' of the bit stream B. In order to close the gap, it is thus necessary to modify the VD of a picture at the start point $B_{in}$ so that the amount of data accumulated in the VBV buffer at the start point $B_{in}$ of the bit stream B matches the amount of data accumulated in the VBV buffer at the end point $A_{out}$ of the bit stream A.

To put it concretely, it is necessary to change the VD of a picture at the start point $B_{in}$ to VD' ($B_{in}$) expressed by the following equation:

$$VD'(B_{in}) = VD(A_{out}) + (HL(B_{in}) - HL(A_{out})) \times 90000/br \quad (1)$$

where a notation VD ($A_{out}$) in the above equation (1) is the VD of a picture at the end point $A_{out}$ whereas a symbol br is a bit rate found from the BR. Notation HL ($B_{in}$) denotes the number of bits, from the first bit of a sequence header or a GOP header to the last bit of a PSC, of a picture at the start point $B_{in}$, and notation HL ($A_{out}$) denotes the number of bits, from the first bit of a sequence header or a GOP header to the last bit of a PSC, of a picture at the end point $A_{out}$.

Thus, at the step S130 of the flowchart shown in FIG. 14, the VD for a picture at the start point $B_{in}$, that is, VD' ($B_{in}$), is computed in accordance with Eq. (1).

If the VD of a picture at the start point $B_{in}$ is changed to VD' ($B_{in}$) found by Eq. (1), it is also necessary to change subsequent VDs included in the bit stream B. The subsequent VDs can be changed by adding VD' ($B_{in}$)–VD ($B_{in}$) to the original values thereof where VD ($B_{in}$) is the value of the VD for the picture at the start point $B_{in}$ prior to the change according to Eq. (1).

At the step S130 of the flowchart shown in FIG. 14, the VD for a picture other than that at the start point $B_{in}$ is found as follows.

It should be noted a value of the VD after being changed of 0 or smaller results in an underflow. On the other hand, a value of the VD after being changed greater than 90000× $S_{VBV}$/br or greater than the hexadecimal FFFE causes an overflow. Since neither an underflow nor an overflow is allowed to occur in the VBV buffer, such a negative or excessively large value of the VD is not allowed. Therefore, at the step S131 of the flowchart shown in FIG. 14, the controller 124 forms a judgment as to whether or not the value of the VD computed at the step S130 is equal to or smaller than 0 or excessively large.

By the way, in the conventional edit processing described above, it is basically necessary to change all the VDs of pictures at the start point $B_{in}$ and the subsequent pictures, giving rise to a hindrance to an effort to increase the speed of the processing.

In addition, an improper value of the VD described above makes it impossible to edit the bit streams prior to MPEG decoding, causing the editing work to become troublesome.

Moreover, the bit rate br which is required in the computation of the VD is found from a BR included in a sequence header. As described above, however, the BR is a value resulting from division of the true bit rate expressed in terms of bps (bits per second) by 400 with fraction part of the value rounded up. Thus, in some cases, the VD can not be found with a high degree of accuracy.

SUMMARY OF THE INVENTION

The present invention addresses the problems described above. It is thus an object of the present invention to provide a picture editing apparatus and a picture editing method that are capable of editing bit streams at a high processing speed in their states as they are.

According to one embodiment, there is provided a picture editing apparatus for composing a 3rd bit stream by concatenation of at least a portion of a 1st bit stream obtained as a result of an operation to compress and encode pictures with at least a portion of a 2nd bit stream also obtained as a result of an operation to compress and encode pictures through work of editing said 1st and 2nd bit streams wherein said operation to compress and encode pictures is carried out by considering an amount of data to be accumulated in a virtual buffer assumed to exist on a receiving side and accumulation quantity information on said amount of data to be accumulated in said virtual buffer is included in said 1st and 2nd bit streams, said picture editing apparatus comprising:

a data accumulation quantity computing means for computing an amount of data to be accumulated in said virtual buffer at a 1st point of junction on said 1st bit stream for connecting said 1st bit stream to said 2nd bit stream and for computing an amount of data to be accumulated in said virtual buffer at a 2nd point of junction on said 2nd bit stream for connecting said 2nd bit stream to said 1st bit stream by using said accumulation quantity information; and a data quantity adjusting means for adjusting an amount of data at a portion of said 3rd bit stream corresponding to a point of junction between said 1st and 2nd bit streams in accordance with a difference between said amounts of data to be accumulated in said virtual buffer at said 1st and 2nd points of junction computed by said data accumulation quantity computing means.

According to another embodiment, there is provided a picture editing method for composing a 3rd bit stream by concatenation of at least a portion of a 1st bit stream obtained as a result of an operation to compress and encode pictures with at least a portion of a 2nd bit stream also obtained as a result of an operation to compress and encode pictures through work of editing said 1st and 2nd bit streams wherein said operation to compress and encode pictures is carried out by considering an amount of data to be accumulated in a virtual buffer assumed to exist on a receiving side and accumulation quantity information on said amount of data to be accumulated in said virtual buffer is included in said 1st and 2nd bit streams, said picture editing method comprising the steps of:

computing an amount of data to be accumulated in said virtual buffer at a 1st point of junction on said 1st bit stream for connecting said 1st bit stream to said 2nd bit stream and computing an amount of data to be accumulated in said virtual buffer at a 2nd point of junction on said 2nd bit stream for connecting said 2nd bit stream to said 1st bit stream by using said accumulation quantity information; and adjusting an amount of data at a portion of said 3rd bit stream corresponding to a point of junction between said 1st and 2nd bit streams in accordance with a difference between said amounts of data to be accumulated in said virtual buffer at said 1st and 2nd points of junction.

According to the picture editing apparatus of one embodiment, a data accumulation quantity computing means computes an amount of data to be accumulated in the virtual buffer at a 1st point of junction on the 1st bit stream for connecting the 1st bit stream to the 2nd bit stream and an amount of data to be accumulated in the virtual buffer at a 2nd point of junction on the 2nd bit stream for connecting the 2nd bit stream to the 1st bit stream by using the accumulation quantity information; and a data quantity adjusting means adjusts an amount of data at a portion of the 3rd bit stream corresponding to a point of junction between the 1st and 2nd bit streams in accordance with a difference between the amounts of data to be accumulated in the virtual buffer at the 1st and 2nd points of junction computed by the data accumulation quantity computing means.

According to the picture editing method of another embodiment, an amount of data to be accumulated in the virtual buffer at a 1st point of junction on the 1st bit stream for connecting the 1st bit stream to the 2nd bit stream and an amount of data to be accumulated in the virtual buffer at a 2nd point of junction on the 2nd bit stream for connecting the 2nd bit stream to the 1st bit stream are computed by using the accumulation quantity information; and an amount of data at a portion of the 3rd bit stream corresponding to a point of junction between the 1st and 2nd bit streams is adjusted in accordance with a difference between the amounts of data to be accumulated in the virtual buffer at the 1st and 2nd points of junction.

The above and other objects, features as well as many of the attendant advantages of the present invention will become more apparent and, thus, readily appreciated and as the same is better understood from a study of the following detailed description of a preferred embodiment with reference of accompanying diagrams showing the embodiment.

BRIEF DESCRIPTION OF THE DRAWINGS

A preferred embodiment of the present invention will be described with reference to accompanying diagrams wherein:

FIG. 8 is an explanatory diagram used for describing how a VBV display of a skipped P picture is found;

FIG. 9 is a flowchart representing pieces of processing carried out by the bit rate inferring unit 26 employed in the picture editing apparatus shown in FIG. 2 to infer a bit rate with a high degree of accuracy from a bit rate BR included in a sequence header;

FIG. 10 is an explanatory diagram used for describing how an inferred value of the bit rate is found;

FIG. 11 is a block diagram showing a typical configuration of the conventional picture editing apparatus;

DETAILED DESCRIPTION OF THE PREFERRED EMBODIMENTS

Figure 1:
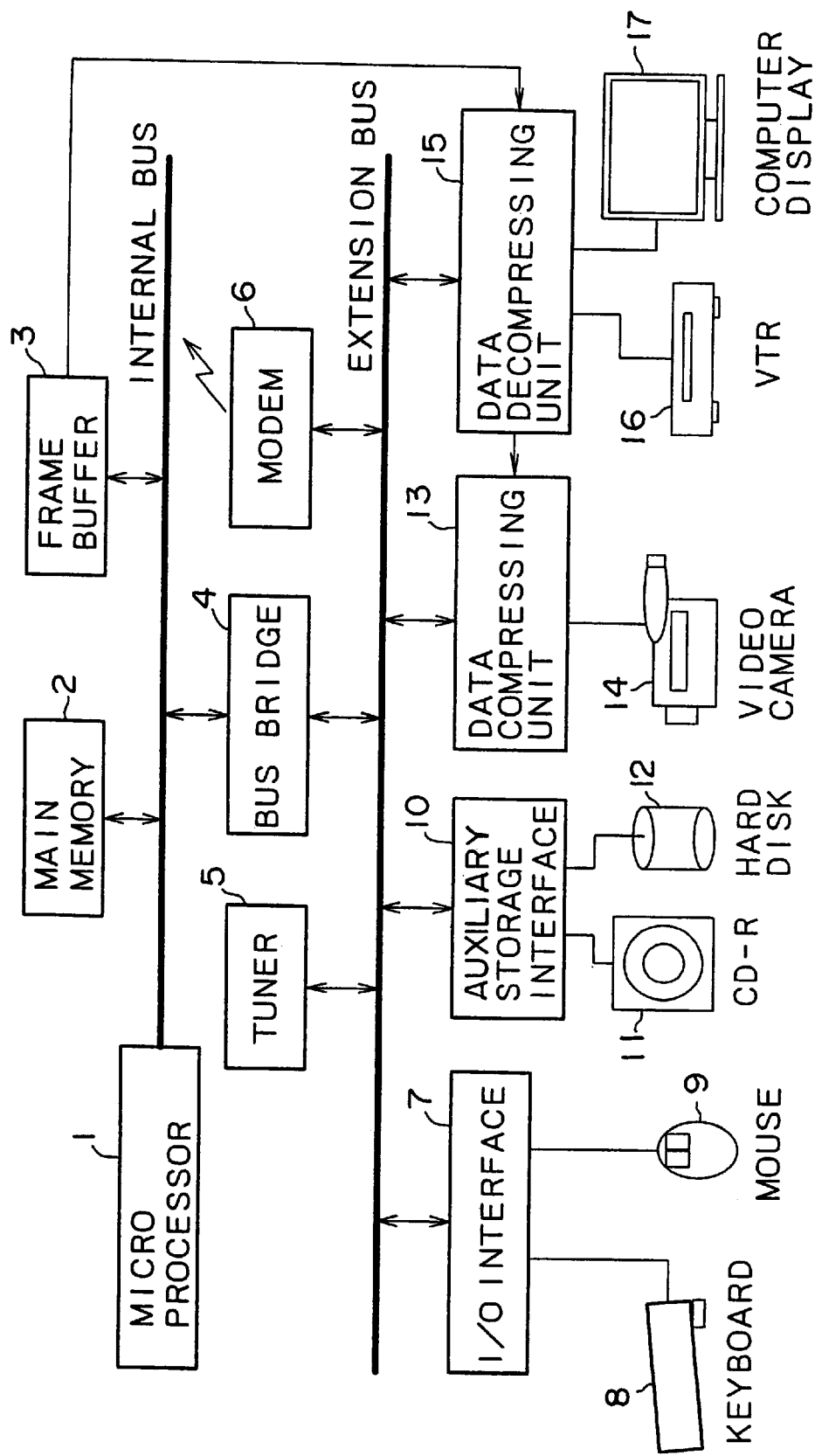
FIG. 1 is a block diagram showing a typical configuration of an embodiment implementing a nonlinear picture editing apparatus to which the present invention is applied.

FIG. 1 is a block diagram showing a typical configuration of an embodiment implementing a nonlinear picture editing apparatus to which the present invention is applied.

As shown in the figure, the nonlinear picture editing apparatus has a configuration typically based on a computer. That is to say, a microprocessor 1 executes application programs stored in a hard disc 12 under an operating system also stored in the hard disc 12 to carry out pieces of predetermined processing such as processing to edit pictures and sound and processing to play back pictures and sound resulting from the edit processing. A main memory unit 2 is used for storing programs executed by the microprocessor 1 and data required in the operation of the microprocessor 1. A frame buffer 3 which is typically implemented by a DRAM (Dynamic Random Access Memory) is used for storing a picture generated by the microprocessor 1. A bus bridge 4 controls exchanges of data between an internal bus and an extension bus such as a PCI (Peripheral Component Interconnect) local bus.

The microprocessor 1, the main memory unit 2, the frame buffer 3 and the bus bridge 4 described above are connected to each other by the internal bus. The remaining blocks and the bus bridge 4 are connected to each other by the extension bus. Thus, the bus bridge 4 is connected to both the internal bus and the extension bus.

A tuner 5 receives a television broadcast signal broadcasted by using typically a ground wave, a satellite or a CATV network. Thus, pictures and sound received by the tuner 5 can also each be treated as an object of editing. A modem 6 controls communication through a telephone line. Therefore, pictures and sound received by the modem 6 from a source such as the Internet can also each be treated as an object of editing. On the contrary, a result of editing work such as a picture and sound can be transmitted to the outside by way of the modem 6 and the telephone line.

An I/O (Input/Output) interface unit 7 generates an operation signal representing an operation carried out by the user on a keyboard 8 and a mouse 9. The keyboard 8 is used by the user for entering data or a command. On the other hand, the mouse 9 is used for moving a cursor displayed on a screen of a computer display unit 17 or for specifying a position on the screen.

An auxiliary storage interface unit 10 is used for controlling operations to read out and write data from and to a recording medium such as a CD-R (Compact Disc Recordable) 11 or the HD (Hard Disc) 12. The CD-R 11 is used typically for recording pictures or sound resulting from edit processing. On the other hand, the hard disc 12 is used for storing the operating system and application programs to be executed by the microprocessor 1 to carry out nonlinear editing work and other kinds of processing. The hard disc 12 is also used for storing pictures and sound to be edited and pictures and sound resulting from editing work.

A data compressing unit 13 carries out compression/encoding on a picture and sound supplied thereto in conformity with typically the MPEG specifications. It should be noted that the data compressing unit 13 is capable of compressing, among other information, data supplied through the extension bus or a data decompressing unit 15 and data supplied by an external apparatus such as a video camera 14.

The video camera 14 records pictures and sound to be edited for example. Provided with a function for interfacing with the video camera 14, the data compressing unit 13 is capable of inputting pictures and sound recorded by the video camera 14.

The data decompressing unit 15 decompresses (or decodes) data compressed (encoded) by the data compressing unit 13 and then outputs. It should be noted that, when necessary, the data decompressing unit 15 outputs decompressed (decoded) data as an overlay on a picture stored in the frame buffer 3. In the embodiment shown in FIG. 1, picture data is supplied from the frame buffer 3 to the data decompressing unit 15 directly through a line connecting both the buffer 3 and the unit 15 or by way of the internal bus, the bus bridge 4 and the extension bus. When picture data is supplied from the frame buffer 3 to the data decompressing unit 15 by way of the internal bus, the bus bridge 4 and the extension bus, however, a data traffic jam may be resulted in if the transmission capacity of the internal and extension buses is low.

A VTR 16 and a display unit 17 are used respectively for recording and displaying pictures and sound output by the data decompressing unit 15 if necessary. It should be noted that, in addition to the display unit 17 which serves as an information displaying means of the microprocessor 1, the pictures and sound output by the data decompressing unit 15 can also be displayed on a TV monitor or the like.

Figure 2:
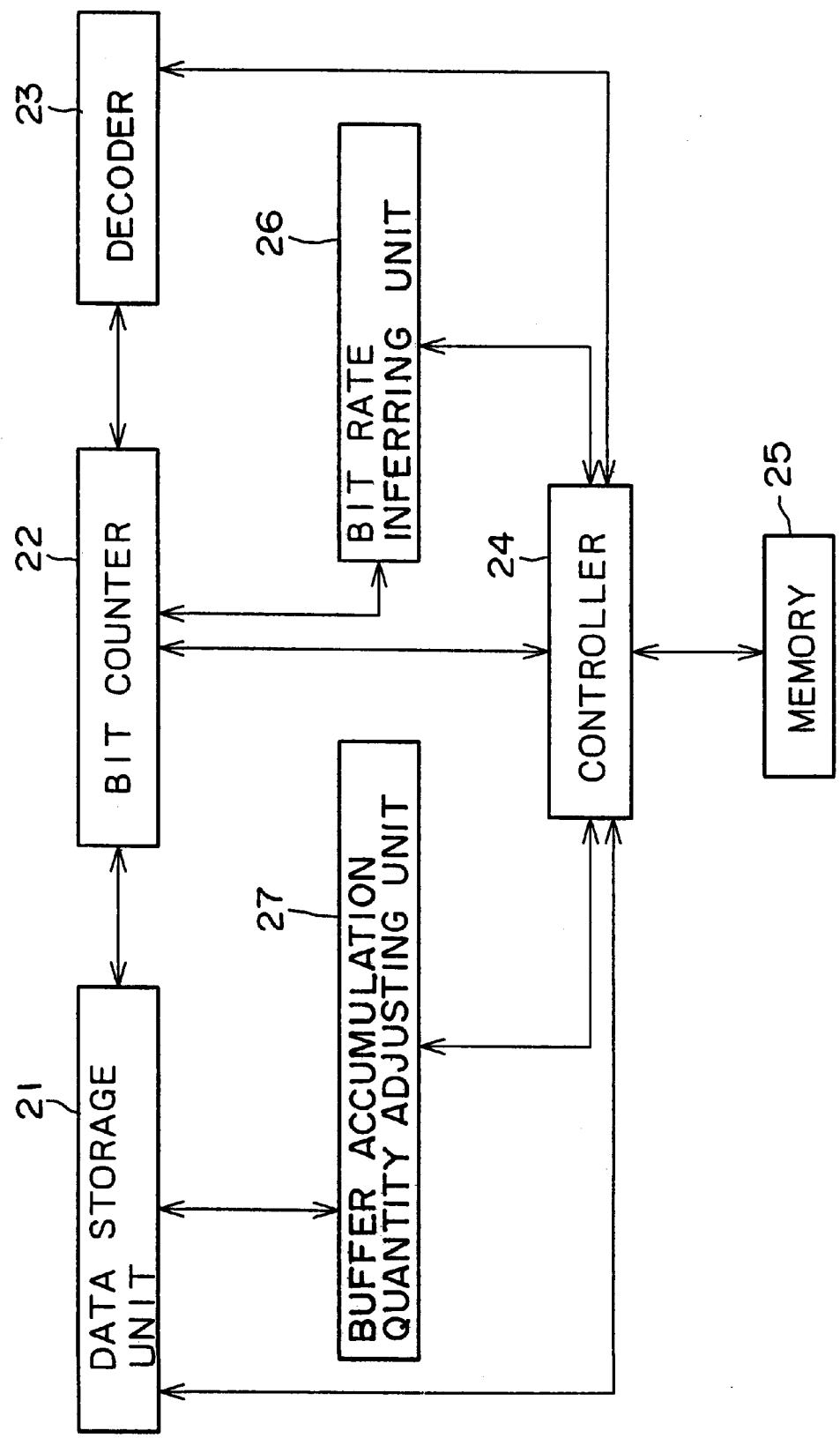
FIG. 2 is a block diagram showing a typical functional configuration of the picture editing apparatus shown in FIG. 1.

Next, the picture editing apparatus shown in FIG. 1 is explained by referring to FIG. 2, a block diagram showing a typical functional configuration of the apparatus. It should be noted that components shown in FIG. 2 which are identical with those shown in FIG. 11 are denoted by the same reference numerals as the latter and their explanation is omitted if not specially needed. As shown in FIG. 2, the picture editing apparatus provided by the present invention is basically the same as the conventional one shown in FIG. 11 except that, in the case of the former, a controller (a data accumulation quantity computing means) 24 is employed in place of the controller 124 of the latter, and a bit rate inferring unit (a bit rate inferring means) 26 as well as a buffer accumulation quantity adjusting unit (a data quantity adjusting means) 27 are added as new components.

Much like the controller 124 shown in FIG. 11, the controller 24 basically controls the data storage unit 21, the bit counter 22 and the decoder 23 in addition to the bit rate inferring unit 26 and the buffer accumulation quantity adjusting unit 27. The bit rate inferring unit 26 infers the bit rates of the bit streams A and B stored in the data storage unit 21 as materials to be edited with a high degree of accuracy on the basis of bit counts output by the bit counter 22 and information output by the controller 24, supplying the inferred bit rates to the controller 24. The buffer accumulation quantity adjusting unit 27 is used for adjusting the data quantity of the bit stream C, a result of editing the bit streams A and B.

It should be noted that the data storage unit 21 shown in FIG. 2 corresponds to the auxiliary storage interface unit 10 and the hard disc 12 shown in FIG. 1 whereas the bit counter 22 corresponds to the microprocessor 1. The decoder 23 and the controller 24 shown in FIG. 2 correspond to the data decompressing unit 15 and the microprocessor 1 shown in FIG. 1 respectively. The memory unit 25 shown in FIG. 2 corresponds to the main memory unit 2 shown in FIG. 1 whereas the bit rate inferring unit 26 and the buffer accumulation quantity adjusting unit 27 correspond to the microprocessor 1.

Next, the operation of the picture editing apparatus shown in FIG. 2 is explained.

Figure 3:
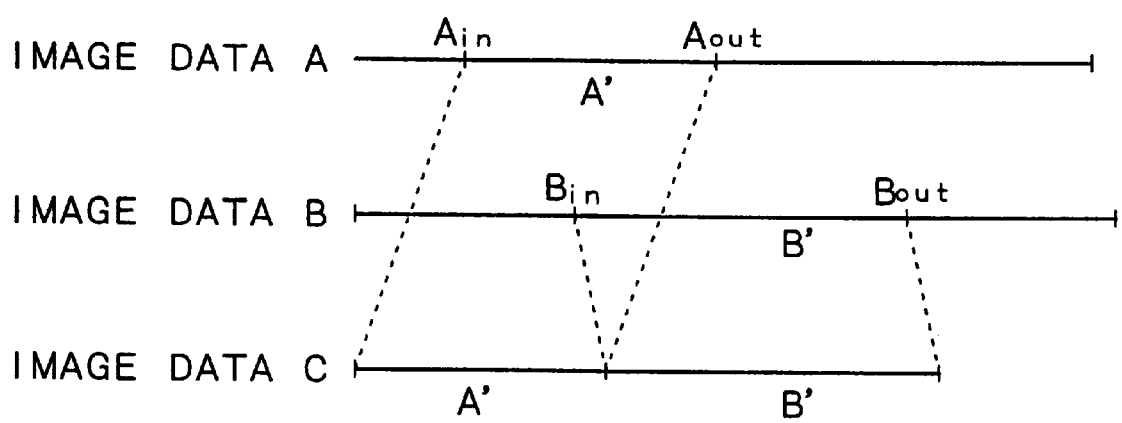
FIG. 3 is a diagram showing how a bit stream C is composed by the picture editing apparatus shown in FIG. 2 by concatenating a scene A' extracted from a bit stream A with a scene B' cut out from a bit stream B with the scenes A' and B' serving as the front and rear halves of the concatenation respectively.
Figure 12:
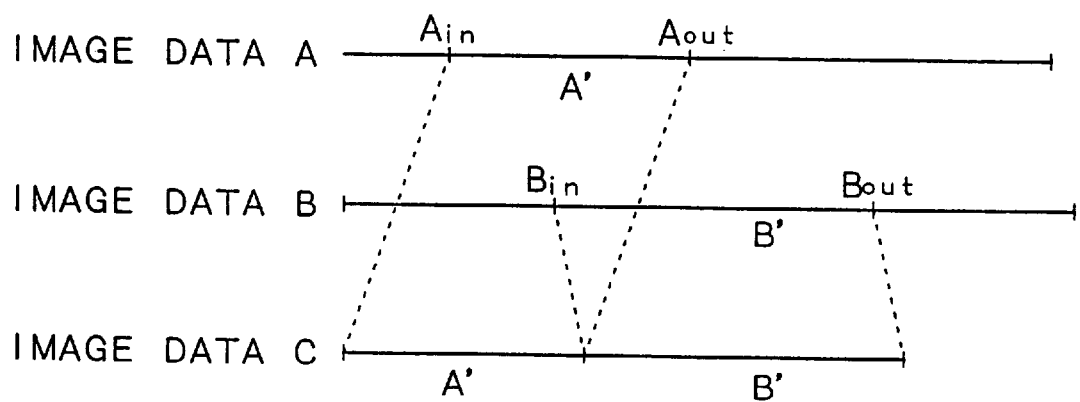
FIG. 12 is a diagram showing how a bit stream C is composed by the conventional picture editing apparatus shown in FIG. 11 by concatenating a scene A' extracted from a bit stream A with a scene B' cut out from a bit stream B with the scenes A' and B' serving as the front and rear halves of the concatenation respectively.

Much like the editing shown in FIG. 12, the bit stream C is composed by concatenating a scene A' extracted from the bit stream A with a scene B' cut out from the bit stream B with the scenes A' and B' serving as the front and rear halves of the concatenation respectively as shown in FIG. 3. Assume that the bit streams A and B which have completed compression and encoding conforming to the MPEG1 specifications in the data compressing unit 13 are already stored in the data storage unit 21.

The controller 24 reads out the bit streams A and B from the data storage unit 21, supplying them to the decoder 23 by way of the bit counter 22. The bit counter 22 counts the number of bits of a bit stream supplied from the data storage unit 21 and supplies the counted number of bits to the bit rate inferring unit 26 which also receives necessary information from the controller 24. The bit rate inferring unit 26 infers the bit rates of the bit streams A and B with a high degree of accuracy on the basis of the bit counts output by the bit counter 22 and the information output by the controller 24, supplying the inferred bit rates to the controller 24.

Processing carried out by the bit rate inferring unit 26 will be explained in detail later.

Figure 4:
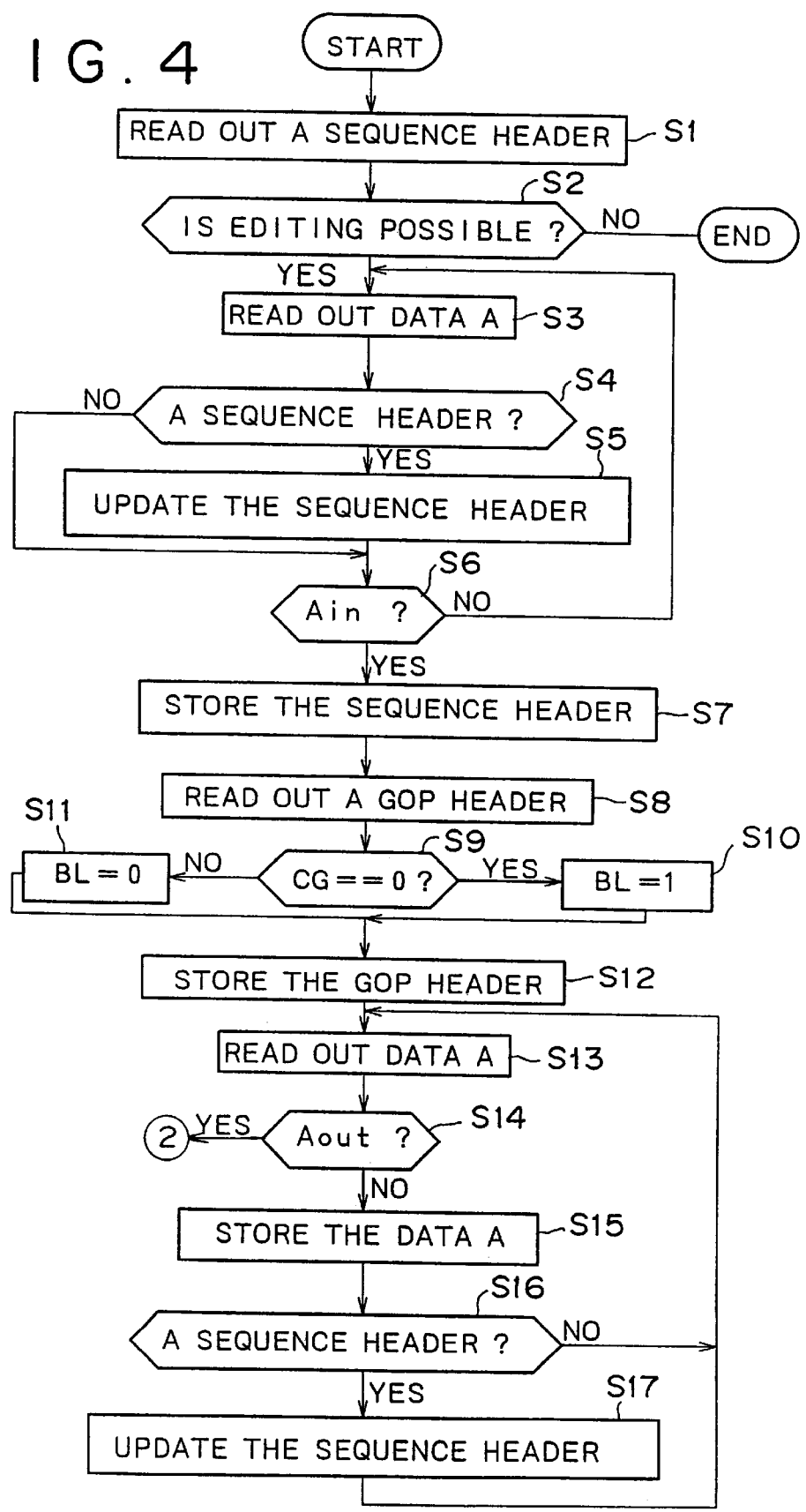
FIG. 4 is a flowchart representing processing carried out by a controller employed in the picture editing apparatus shown in FIG. 2 using a result of inferring a bit rate received from a bit rate inferring unit 26.

FIG. 4 is a flowchart representing processing which is carried out by the controller 24 using a result of inferring a bit rate received from the bit rate inferring unit 26 if a bit rate is required when the controller 24 receives the result of inferring a bit rate from the bit rate inferring unit 26.

Figure 13:
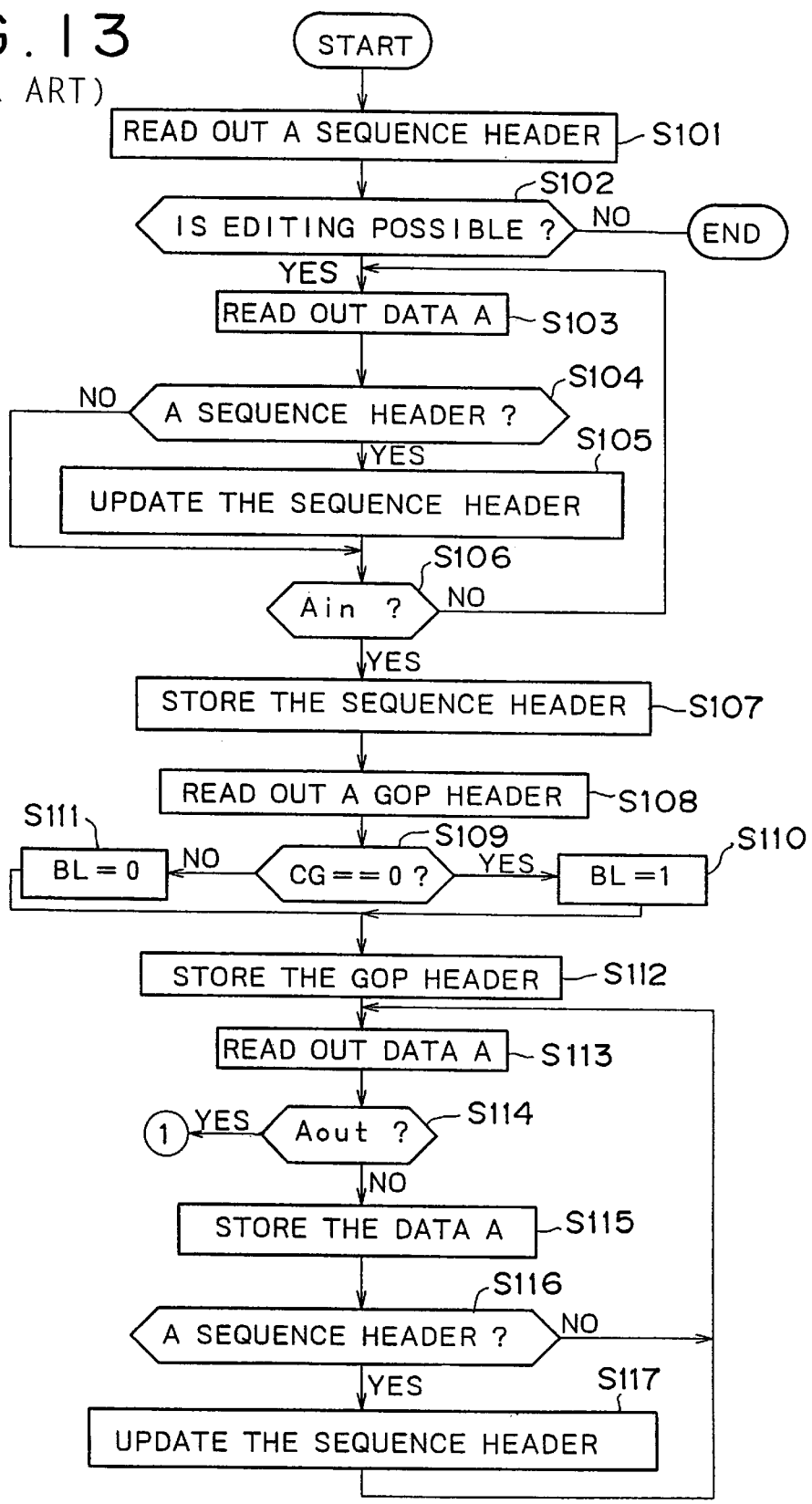
FIG. 13 is a flowchart representing processing carried out by a controller employed in the conventional picture editing apparatus shown in FIG. 11.

As indicated by the flowchart shown in the figure, the controller 24 carries out pieces of processing at steps S1 to S17 which are the same as those carried out at the steps S101 to S117 of the flowchart shown in FIG. 13.

The judgment at the step S6 as to whether or not data read out from the data storage unit 21 is a picture at the start point $A_{in}$ is formed typically as follows. As described above, what can be specified as the start point $A_{in}$ is the head of a GOP which starts with a group start code GSC. In some cases, a sequence header starting with a sequence header code SHC is placed in front of a GOP. For this reason, first of all, an SHC and a GSC are detected.

Assume that the start point $A_{in}$ is specified by using a time code which is recorded in a TC (Time Code) field of a GOP header. Thus, the controller 24 forms a judgment based on a TC received from the decoder 23 as to whether or not a received picture is a picture at the start point $A_{in}$. In the case of a start point $A_{in}$ specified by using the number of pictures composing the bit stream A resulting from a picture counting operation starting with a picture at the head of the bit stream A, the controller 24 receives a picture start code PSC recorded in a picture header and then a temporary reference TR recorded after the PSC from the decoder 23. The TR represents the so-called serial numbers of pictures composing a GOP and is thus reset at a picture at the head of the GOP. Accordingly, the number of pictures composing the GOP can be found by recognizing the maximum value of the TRs of the GOP. It should be noted, however, that since the TR begins from 0, the number of pictures composing a GOP is equal to the maximum value of the TRs of the GOP plus one. The controller 24 counts the number of pictures composing the bit stream A by adding up picture counts of consecutive GOPs in the bit stream and uses the counted number of pictures as a base for forming a judgment as to whether or not a received picture is a picture at the start point $A_{in}$.

It should be noted that the start point $B_{in}$, the end point $A_{out}$ and the end point $B_{out}$ are detected in the same way as the start point $A_{in}$. If time codes are used for specifying the start and end points $A_{in}$, $B_{in}$, $A_{out}$ and $B_{out}$, the time codes representing the end points $A_{out}$ and $B_{out}$ set to point to pictures at the ends of the bit streams A and B respectively can not be detected. That is to say, if the time code specified as the end point $A_{out}$ can not be detected even if the sequence end code SEC of the bit stream A is detected, the sum of a TC obtained for the last GOP and a period of time corresponding to the number of pictures composing the last GOP is compared with the time code specified as the end point $A_{out}$. If they match each other, a picture immediately preceding the SEC is judged to be a picture at the end point $A_{out}$. This technique of detecting the end point $A_{out}$ is also applicable to the end point $B_{out}$ as well. As described earlier, the number of pictures composing the last GOP is equal to the maximum value of the TRs of the GOP plus one.

Figure 5:
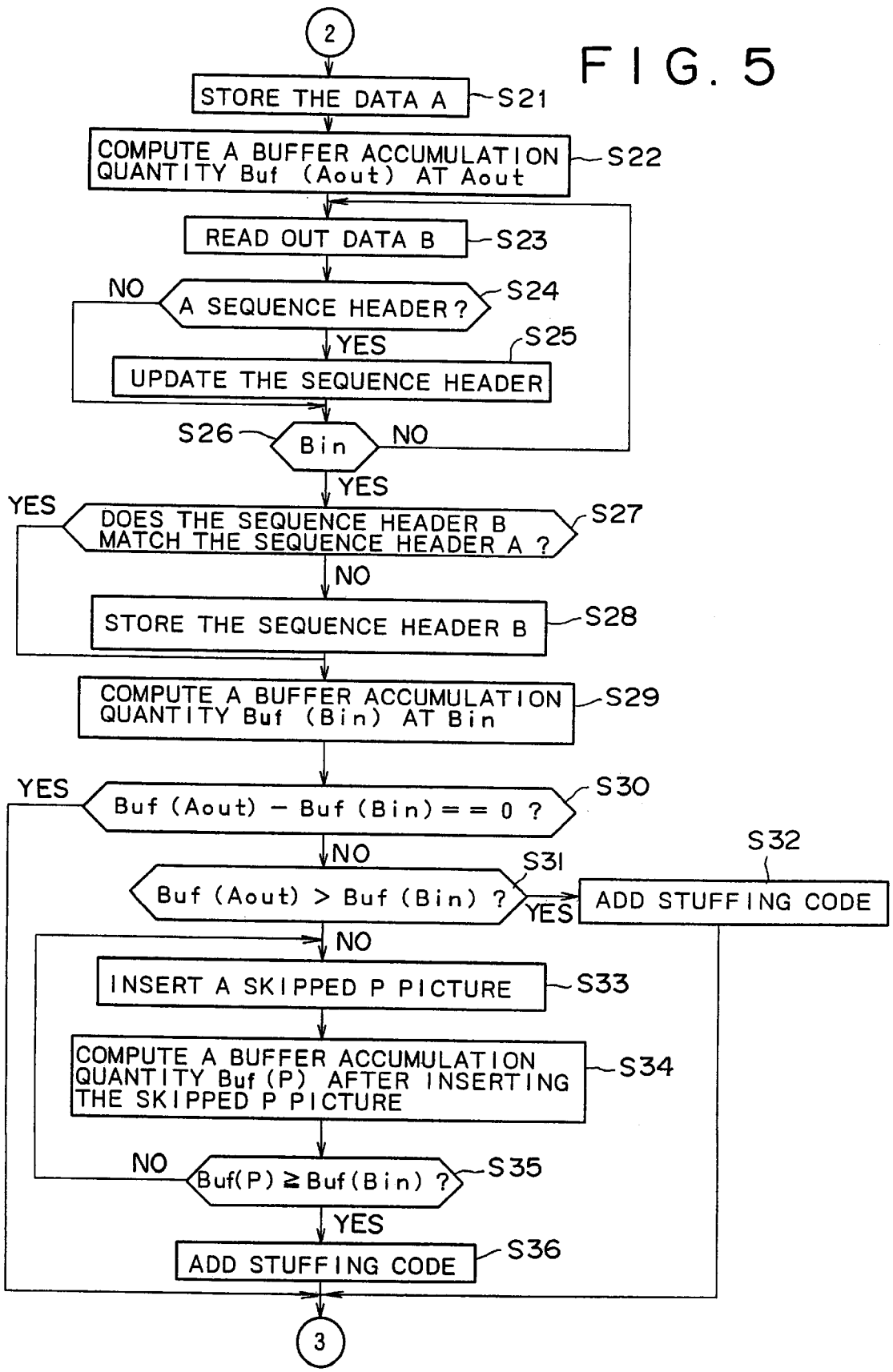
FIG. 5 is a diagram showing a continuation to the flowchart shown in FIG. 4.

If the outcome of a judgment formed at the step S14 of the flowchart shown in FIG. 4 during the processing carried out by the controller 24 at the steps S1 to S17 indicates that a picture at the end point $A_{out}$ has been read out, the flow of the processing goes on to a step S21 of a flowchart shown in FIG. 5, a diagram showing a continuation to the flowchart shown in FIG. 4. At the step S21, data read out at the step S13 is stored in the data storage unit 21 as data of the bit stream C. The flow of the processing then goes on to a step S22

At the step S22, the controller 24 computes Buf ($A_{out}$), that is, the amount of data to be accumulated in the VBV buffer at the end point $A_{out}$, by using the following equation:

$$\text{Buf}(A_{out}) = \text{VD}(A_{out}) \times R/90000 + \text{HL}(A_{out}) \qquad (2)$$

where notation VD ($A_{out}$) in Eq. (2) represents the VD of a picture at the end point $A_{out}$ and notation HL ($A_{out}$) denotes the number of bits, from the first bit of a sequence header or a GOP header (strictly speaking, the first bit of a sequence header code SHC or a group start code GSC) to the last bit of a PSC, of a picture at the end point $A_{out}$. A symbol R is an inferred value of the bit rate produced by the bit rate inferring unit 26.

In the case of an end point $A_{out}$ set to point to a picture at the end of the bit stream A, VD ($A_{out}$) can not be obtained. In this case, Buf ($A_{out}$), the amount of data to be accumulated in the VBV buffer at the end point $A_{out}$, is computed by using Eq. (3) in place of Eq. (2) as follows:

$$\text{Buf}(A_{out}) = \text{Buf}(A_{out}') - \text{DL}(A_{out}') \qquad (3)$$

where a symbol $A_{out}'$ in Eq. (3) is a picture immediately preceding a picture at the end point $A_{out}$. Thus, since Buf ($A_{out}'$) is the amount of data to be accumulated in the VBV buffer at a point $A_{out}'$ preceding the end point $A_{out}$ by 1 picture, Buf ($A_{out}'$) can be found by application of Eq. (2). Notation DL ($A_{out}'$) is the number of bits, starting with a first bit of a sequence header code SHC, a group start code GSC or a picture start code PSC of a picture at the point $A_{out}'$ and ending with a bit immediately preceding the sequence header code SHC, the group start code GSC or the picture start code PSC of the next picture, that is, a picture at the end point $A_{out}$. DL ($A_{out}'$) is found from an output of the bit counter 22.

Figure 14:
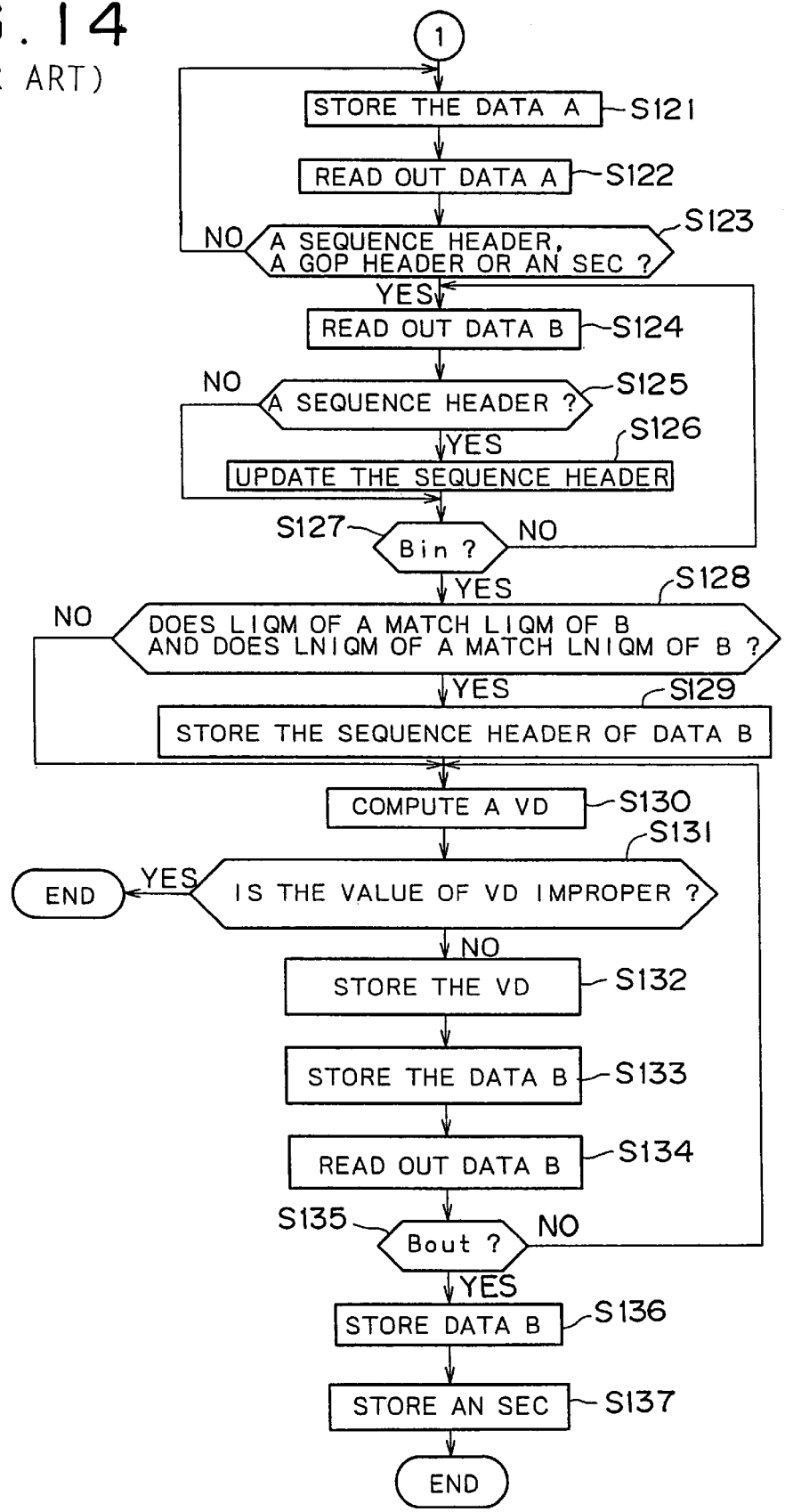
FIG. 14 is a diagram showing a continuation to the flowchart shown in FIG. 13.

After the amount of data to be accumulated in the VBV buffer at the end point $A_{out}$ Buf ($A_{out}$) has been computed, the flow of the processing goes on to steps S23 to S26 to carry out the same pieces of processing as those carried out at the steps S124 to S127 respectively of the flowchart shown in FIG. 14.

If the outcome of the judgment formed at a step S26 indicates that that a picture at the start point $B_{in}$ has been read out, the flow of the processing proceeds to a step S27 at which the controller 24 compares the most recent sequence headers of the bit streams A and B stored in the memory unit 25 with each other to form a judgment as to whether or not the two sequence headers match each other. If the outcome of the judgment formed at the step S27 indicates that the most recent sequence headers do not agree with each other, the flow of the processing goes on to a step S28 at which the controller 24 stores the most recent sequence header for the bit stream B stored in the memory unit 25 in the data storage unit 21 as a sequence header of the bit stream C currently being composed. The flow of the processing then proceeds to a step S29. If the outcome of the judgment formed at the step S27 indicates that the most recent sequence headers agree with each other, on the other hand, the flow of the processing directly goes on to the step S29 by skipping the step S28.

It should be noted that, even if the outcome of the judgment formed at the step S27 indicates that the most recent sequence headers of the bit streams A and B agree with each other, the controller 24 may also store the most recent sequence header for the bit stream B stored in the memory unit 25 in the data storage unit 21 as a sequence header of a bit stream C.

At the step S29, the controller 24 computes the amount of data to be accumulated in the VBV buffer at the start point $B_{in}$ Buf ($B_{in}$) in the same way to compute Buf ($A_{out}$) at the step S22. The flow of the processing then goes on to a step S30 to form a judgment as to whether or not the amount of data to be accumulated in the VBV buffer at the start point $B_{in}$ Buf ($B_{in}$) agrees with the amount of data to be accumulated in the VBV buffer at the end point $A_{out}$ Buf ($A_{out}$).

Figure 6:
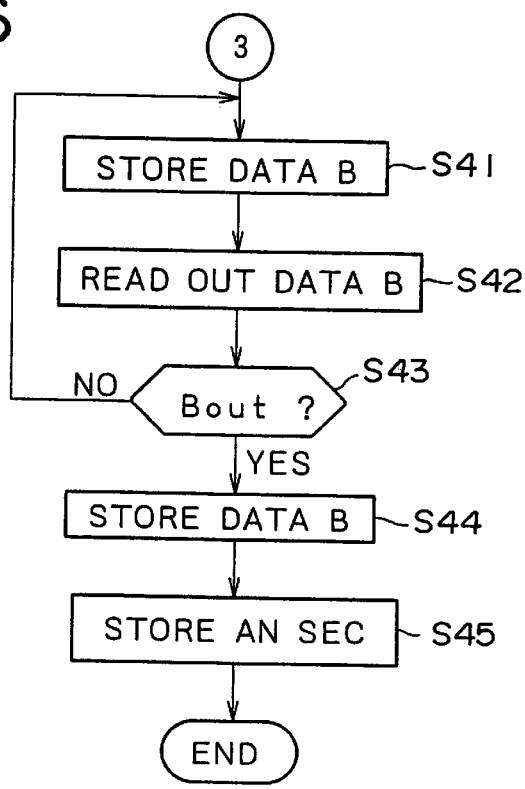
FIG. 6 is a diagram showing a continuation to the flowchart shown in FIG. 5.

If the outcome of the judgment formed at the step S30 indicates that the amount of data accumulated in the VBV buffer at the start point $B_{in}$ Buf ($B_{in}$) agrees with the amount of data accumulated in the VBV buffer at the end point $A_{out}$ Buf ($A_{out}$), the flow of the processing continues to a step S41 shown in FIG. 6, a diagram showing the continuation to the flowchart shown in FIG. 5, skipping pieces of processing carried out at steps S31 to S36 to be described below to establish VD matching at a point of junction between the bit streams A and B since such pieces of processing are not required.

If the outcome of the judgment formed at the step S30 indicates that the amount of data to be accumulated in the VBV buffer at the start point $B_{in}$ Buf ($B_{in}$) does not agree with the amount of data to be accumulated in the VBV buffer at the end point $A_{out}$ Buf ($A_{out}$), on the other hand, the flow of the processing continues to a step S31 to establish VD matching at the point of junction between the bit streams A and B as follows.

At the step S31, the controller 24 forms a judgment as to whether or not the amount of data to be accumulated in the VBV buffer at the end point $A_{out}$ Buf ($A_{out}$) is greater than the amount of data to be accumulated in the VBV buffer at the start point $B_{in}$ Buf ($B_{in}$). If the outcome of the judgment formed at the step S31 indicates that the amount of data to be accumulated in the VBV buffer at the end point $A_{out}$ Buf ($A_{out}$) is greater than the amount of data to be accumulated in the VBV buffer at the start point $B_{in}$ Buf ($B_{in}$), corrective processing needs to be carried out so that data of an amount greater than the real data by the difference (Buf ($A_{out}$)−Buf ($B_{in}$)) will be read out from the VBV buffer at the end point $A_{out}$.

To put it concretely, if the amount of data to be accumulated in the VBV buffer at the end point $A_{out}$ Buf ($A_{out}$) is greater than the amount of data to be accumulated in the VBV buffer at the start point $B_{in}$, the flow of the processing goes on to a step S32 at which stuffing code is stored in the data storage unit 21 as data of the bit stream C, strictly speaking, as additional data to a picture at the end point $A_{out}$, by the buffer accumulation quantity adjusting unit 27 under control executed by the controller 24. The flow of the processing then proceeds to the step S41 of the continuation flowchart shown in FIG. 6.

The stuffing code is data comprising one or a plurality of bytes each having the value 0. The stuffing code can be placed in front of a start code. In an MPEG system, skipped in a decoding operation, the stuffing code does not have any effect on a picture resulting from the decoding operation. In the control of the VBV buffer, however, the number of bits included in the stuffing code is counted as part of data composing a bit stream to which the stuffing code is added. Thus, by storing the stuffing code as additional data to a picture at the end point $A_{out}$, for example, the amount of data read out from the VBV buffer in an operation to decode the picture at the end point $A_{out}$ can be increased. As a result, the amount of data accumulated in the VBV buffer at the end point $A_{out}$ Buf ($A_{out}$) can be reduced to match the amount of data to be accumulated in the VBV buffer at the start point $B_{in}$ Buf ($B_{in}$).

At the step S32, stuffing code of the amount of C bytes expressed by the following equation is stored in the data storage unit 21.

$$C=\text{INT}((\text{Buf }(A_{out})-\text{Buf}(B_{in}))/8) \qquad (4)$$

where notation INT ( ) in Eq. 4 means a maximum integer equal to or smaller than the value of an expression enclosed by the parentheses.

If the outcome of the judgment formed at the step S31 indicates that the amount of data to be accumulated in the VBV buffer at the end point $A_{out}$ Buf ($A_{out}$) is not greater than the amount of data to be accumulated in the VBV buffer at the start point $B_{in}$ Buf ($B_{in}$), that is, if Buf ($A_{out}$) is smaller than Buf ($B_{in}$), on the other hand, corrective processing needs to be carried out so that the amount of data to be accumulated in the VBV buffer at the end point $A_{out}$ is increased by the difference (Buf ($B_{in}$)−Buf ($A_{out}$)).

That is to say, if Buf ($A_{out}$) is smaller than Buf ($B_{in}$), the flow of the processing goes on to a step S33 at which the buffer accumulation quantity adjusting unit 27 stores data of a skipped P picture after the data of a picture at the end point $A_{out}$ in the data storage unit 21 as data composing the bit stream C being constructed under control executed by the controller 24.

A skipped P-picture is a picture having the so-called prediction error with a value of 0 and a moving vector located at the point 0 (0, 0). A skipped P picture is decoded with an immediately preceding decoded I picture or an immediately preceding decoded P picture used as a reference picture. The amount of data of a skipped P picture is extremely small. In the case of a picture having dimensions of 352 pixels in the horizontal direction by 240 pixels in the vertical direction, for example, the amount of data resulting from an operation to decode a skipped P picture in conformity with the MPEG specifications is 232 bits or 29 bytes.

Figure 15:
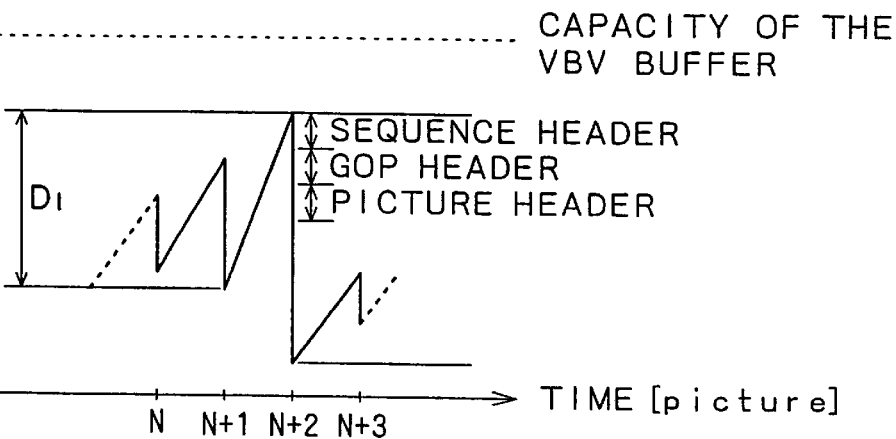
FIG. 15 is a diagram showing changes of the amount of data accumulated in a VBV buffer.
Figure 16:
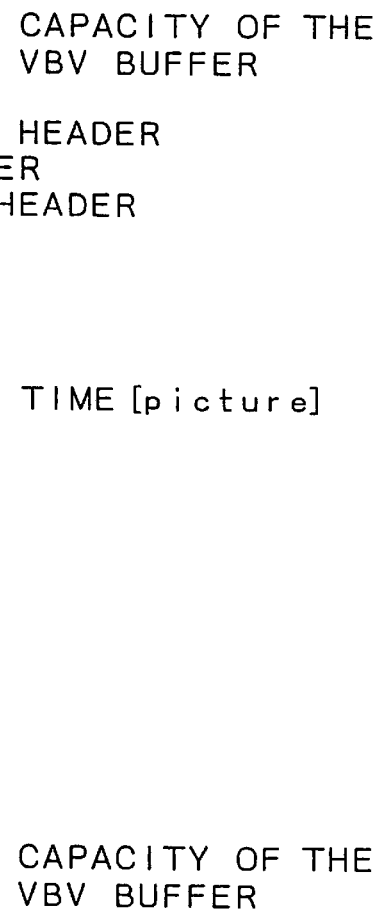
FIG. 16 is a diagram showing a mismatch of the amount of data accumulated in the VBV buffer which is resulted in when the scene A' of the bit stream A is concatenated with the scene B' of the bit stream B.

As shown in FIG. 15, on the other hand, during a period between an operation to read out a picture from the VBV buffer and an operation to read out a next picture, data of the amount of a bit rate/a picture rate is accumulated in the VBV buffer. Thus, by inserting a picture with a small amount of data such as a skipped P picture, the amount of data to be accumulated in the VBV buffer at a fixed bit rate can be increased considerably. As a result, the amount of data to be accumulated in the VBV buffer Buf (P) with a skipped P picture added thereto can be increased to a value equal to or greater than Buf ($B_{in}$).

After the skipped P picture is inserted, that is, stored in the data storage unit 21, the flow of the processing goes on to a step S34 at which the controller 24 computes the amount of data to be accumulated in the VBV buffer Buf (P) with a skipped P picture added thereto. Then, the flow of the processing goes on to a step S35. Assume that the amount of data to be accumulated in the VBV buffer before the insertion of a skipped P picture is Buf ($P_{-1}$). In this case, the amount of data to be accumulated in the VBV buffer Buf (P) with a skipped P picture added thereto is given by the following equation:

$$Buf(P)=Buf(P_{-1})+R/pr-Dp \quad (5)$$

where symbols R, pr and $D_p$ used in Eq. (5) represent an inferred value of the bit rate obtained from the bit rate inferring unit 26, a picture rate found from a PR field in the sequence header and the amount of data of the skipped P picture respectively.

At the step S35, the controller 24 forms a judgment as to whether or not the amount of data to be accumulated in the VBV buffer Buf (P) with a skipped P picture added thereto is equal to or greater than Buf ($B_{in}$). If the outcome of the judgment formed at the step S35 indicates that Buf (P) is smaller than Buf ($B_{in}$), the flow of the processing returns to the step S33 at which another skipped P picture is inserted in order to further increase the amount of data to be accumulated in the VBV buffer.

If the outcome of the judgment formed at the step S35 indicates that Buf (P) is greater than Buf ($B_{in}$), on the other hand, the flow of the processing goes on to a step S36 at which stuffing code is stored in the data storage unit 21 as data of the bit stream C by the buffer accumulation quantity adjusting unit 27 under control executed by the controller 24 for the skipped P picture last inserted in the same way as the step S32 so that the amount of data accumulated in the VBV buffer Buf (P) for the skipped P picture last inserted is reduced to match Buf($B_{in}$). The flow of the processing then goes on to the step S41 of the continuation procedure shown in FIG. 6.

It should be noted that stuffing code is stored at the step S36 only if the outcome of the judgment formed at the step S35 indicates that Buf (P) is greater than Buf ($B_{in}$). Should Buf (P) be found equal to Buf ($B_{in}$) by chance at the step S35, the processing supposed to be carried out at the step S36 is skipped.

The pieces of processing carried out at the step S41 of the continuation procedure shown in FIG. 6 and the subsequent steps S42 to S45 are the same as those of the steps S133 to S137 respectively of the flowchart of the conventional picture editing apparatus shown in FIG. 14. The processing is terminated after the execution of the step S45.

In an operation to compose a bit stream C (a third bit stream) through editing wherein at least a portion of a bit stream A (a first bit stream) resulting from MPEG encoding is concatenated with at least a portion of a bit stream B (a second bit stream) also resulting from MPEG encoding, the amounts of data to be accumulated in a VBV buffer at an end point $A_{out}$ (a first point of junction) of the bit stream A and at a start point $B_{in}$ (a second point of junction) of the bit stream B are computed from VD values and the difference between the amounts of data is used for adjusting the amount of data at a portion on the bit stream C corresponding to the points of junction between the bit streams A and B (A' and B') so that VD matching at the points of junction can be established without the need to change VDs of the bit stream B. As a result, the bit streams A and B can be edited at a high processing speed. In addition, it is no longer necessary to once decode the bit streams A and B in conformity with the MPEG specifications prior to the editing work.

It should be noted that, if Buf ($A_{out}$) is found smaller than Buf ($B_{in}$) in the picture editing process described above, the amount of data accumulated in the VBV buffer at the end point $A_{out}$ is increased by the difference Buf ($B_{in}$)–Buf ($A_{out}$) by inserting skipped P pictures and storing stuffing code at the steps S33 to S36. The amount of data accumulated in the VBV buffer at the end point Aout can also be increased by the difference Buf ($B_{in}$)–Buf ($A_{out}$) as follows.

The amount of data accumulated in the VBV buffer at the end point $A_{out}$ is increased by the difference Buf ($B_{in}$)–Buf ($A_{out}$) for example by reducing the amount of data read out from the VBV buffer in an operation to decode data of a picture at the end point Aout by the difference Buf ($B_{in}$)–Buf ($A_{out}$). Thus, if stuffing code exists as data of a picture at the end point $A_{out}$, the amount of data read out from the VBV buffer can be reduced by eliminating the stuffing. In order to adjust the amount of data by adopting this technique, however, the amount of data of stuffing code which exists as data of a picture at the end point $A_{out}$ is required to be equal to or greater than the difference Buf ($B_{in}$)–Buf ($A_{out}$).

If a skipped P picture is inserted into a location after the end point $A_{out}$ as described above, the same picture as a picture at the end point $A_{out}$ will follow the picture at the end point $A_{out}$ in an operation to decode. If the same pictures appear consecutively in the course of a scene, the movement of the picture is not natural, causing the screen watcher to feel a sense of incompatibility in some cases. Since the same pictures appear consecutively at a point of junction between the bit streams A and B or the so-called edit point, however, the unnatural movement of the picture is not striking, not so much causing the screen watcher to be aware of the unnatural movement so as to feel a sense of incompatibility.

The syntax of a skipped P picture inserted at the step S33 of the flowchart shown in FIG. 5 is given below. It should be noted that, in this case, the picture has dimensions of 352 pixels in the horizontal direction by 240 pixels in the vertical direction.

```
picture ( ) {
    picture_start_code          0x0000010
    temporal_reference          10 bit unsigned int
    picture_coding_type         010
    vbv_delay                   found by computation
    full_pel_forward_vector     0
    forward_f_code              001
    extra_bit_picture           0
    byte_alignment              000000
    slice ( ) {
        slice_start_code            0x00000101
        quantizer_scale             11111
        extra_bit slice             0
        macroblock ( ) {
            macroblock_address_increment    1
            macroblock_type                 001
            motion_horizontal_forward_code  1
            motion_vertical_forward_code    1
            macroblock_escape               0000  0001  000
            macroblock_escape               0000  0001  000
            macroblock_escape               0000  0001  000
            macroblock_escape               0000  0001  000
            macroblock_escape               0000  0001  000
            macroblock_escape               0000  0001  000
            macroblock_escape               0000  0001  000
            macroblock_escape               0000  0001  000
            macroblock_escape               0000  0001  000
            macro_address_increment         0000  0011  001
            macroblock_type                       001
```

```
            motion_horizontal_forward_code        1
            motion_vertical_forward_code          1
        }
    }
    byte alignment 0
}
```

Figure 7A:
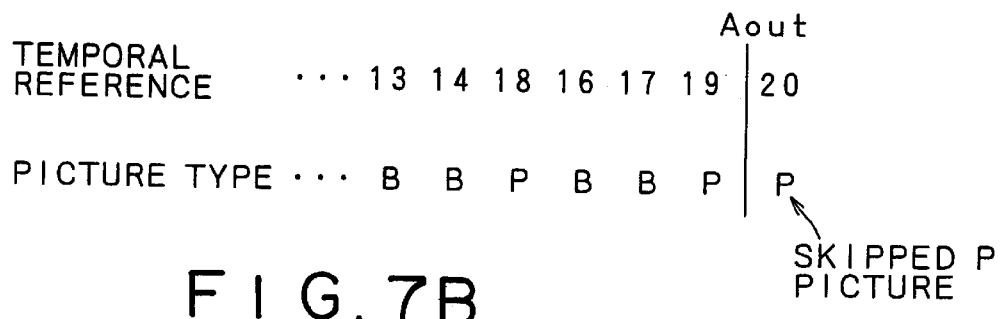
FIGS. 7A and 7B are explanatory diagrams used for describing how a temporal reference of an inserted skipped P picture is determined.
Figure 7B:
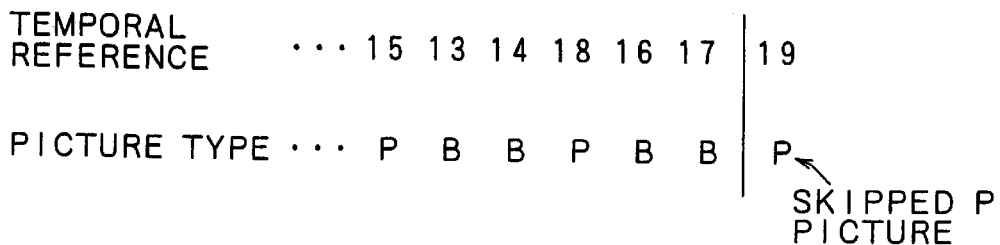

If the picture at the end point is $A_{out}$ is an I or P picture, the temporal reference of the skipped P picture is equal to the temporal reference of the I or P picture plus one. If the picture at the end point $A_{out}$ is a B picture, on the other hand, the temporal reference of the skipped P picture is equal to the temporal reference of the B picture plus two. FIG. 7 is an explanatory diagram used for describing how the temporal reference of an inserted skipped P picture is determined. As shown in the figure, if the picture at the end point $A_{out}$ is a P picture with a temporal reference of 19 as shown in FIG. 7A, for example, the temporal reference of the skipped P picture is equal to 20, the sum of the temporal reference 19 of the P picture and the value one. If the picture at the end point $A_{out}$ is a B picture with a temporal reference of 17 as shown in FIG. 7B, on the other hand, the temporal reference of the skipped P picture is equal to 19, the sum of the temporal reference 17 of the P picture and the value two.

FIG. 8 is an explanatory diagram used for describing how the VBV delay of a skipped P picture is found. The VBV delay is found in accordance with the following equation.

$$VD[N]=INT(VD[N-1]+90000\times(1/pr-BC[N-1, N]/R)) \quad (6)$$

where notations VD[N] and BC[N-1, N] used in Eq. (6) mean a VBV delay of an Nth picture and the amount of data or the bit count of the (N-1)th picture as shown in FIG. 8 respectively. It should be noted that BC[N-1, N] is the number of bits, for example, from a bit following the picture start code PSC of the (N-1)th picture to the last bit of the picture start code PSC of the Nth picture, which is counted by the bit counter 22. In some cases, stuffing code exists in front of a start code included each header. In this case, the stuffing code is included in the length of the header. A symbol pr appearing in Eq. (6) is a picture rate which is found as will be described later.

In the syntax shown above, a macroblock_escape is repeated 9 times. This is because the picture has dimensions of 352 pixels in the horizontal direction by 240 pixels in the vertical direction. In general, the macroblock escape is repeated MEC times where MEC is expressed by the following equation.

$$MEC=INT((\text{the number of macroblocks in the picture}-1)/33) \quad (7)$$

In addition, in the syntax shown above, the macroblock_address_increment is set at 0000 0011 001. This is also because the picture has dimensions of 352 pixels in the horizontal direction by 240 pixels in the vertical direction. In general, the macroblock_address_increment is a value obtained by transforming a remainder of a division of the number of macroblocks in the picture by 33 in accordance with Table B.1 prescribed in the ISO-11172-2 specifications.

The following is a description of processing carried out by the bit rate inferring unit 26 employed in the picture editing apparatus shown in FIG. 2 to infer a bit rate with a high degree of accuracy from a bit rate BR included in a sequence header with reference to a flowchart shown in FIG. 9.

The bit rate inferring apparatus 26 infers a bit rate with a high degree of accuracy from the amount of data between two points in a bit stream and the bit rate BR. As shown in FIG. 9, the flowchart begins with a step S51 at which the two points $P_1$ and $P_2$ are set. The points $P_1$ and $P_2$ are typically the start and end points $A_{in}$ and $A_{out}$ respectively in the case of the bit stream A or the start and end points $B_{in}$ and $B_{out}$ respectively in the case of the bit stream B. It should be noted, however, that the points $P_1$ and $P_2$ can be any points in a bit stream as long as the interval between the two points, that is, the number of pictures between the two points, satisfies a condition to be described later.

After the two points $P_1$ and $P_2$ have been set, pieces of predetermined information are supplied to the bit rate inferring unit 26 from the bit counter 22 and the controller 24.

To put it in detail, the bit counter 22 supplies the amount of data $BC[P_1, P_2]$ starting with a bit following a picture start code PSC at the point $P_1$ and ending with the last bit of a PSC at the point $P_2$ as shown in FIG. 10, an explanatory diagram used for describing how an inferred value of the bit rate is found, to the bit rate inferring unit 26. In the example shown in FIG. 10, the points $P_1$ and $P_2$ are set at positions where a sequence header SH and a GOP header GH both exist. It should be noted, however, that the points $P_1$ and $P_2$ can also be set at positions where no sequence header SH or none of the sequence header SH and the GOP header GH exists.

On the other hand, the controller 24 supplies a bit rate BR and a picture rate PR included in a sequence header as well as the VBV delays $VD[P_1]$ and $VD[P_2]$ of the points $P_1$ and P2 included in the picture header, pieces of information output by the decoder 23, to bit rate inferring unit 26.

It should be noted that, in the bit rate inferring unit 26, the picture rate PR and the bit rate BR are transformed as follows. In accordance with the MPEG1 specifications, the values 1 to 8 of the picture rate PR are transformed into frequencies of 23.976 Hz, 24.000 Hz, 25.000 Hz, 29.970 Hz, 30.000 Hz, 50.000 Hz, 59.940 Hz and 60.000 Hz respectively which each represent a picture rate pr. On the other hand, the bit rate BR is transformed into a bit rate br by being multiplied by 400. As described earlier, the bit rate BR is a value resulting from division of the actual bit rate expressed in terms of bps (bits per second) by 400 with fraction part of the value rounded up. Thus, the actual bit rate has a value in the range of (br−399) to br.

After the bit rate inferring unit 26 receives the pieces of necessary information from the bit counter 22 and the controller 24 upon completion of the processing carried out at the step S51, the flow of the processing goes on to a step S52 at which a candidate for the number of pictures (n) existing between the points $P_1$ and $P_2$ is calculated.

The number of pictures (n) existing between the points $P_1$ and $P_2$ is calculated in accordance with Eq. (8) as follows:

$$n=((VD[P_2]-VD[P_1]+E2-E1)/90000+BC[P_1, P_2]/br)\times pr \quad (8)$$

where notations E1 and E2 used in Eq. (8) are rounding errors of VD $[P_2]$ and VD $[P_1]$ respectively which each have a value in the range 0 to 1. A symbol pr in the above equation is a picture rate found from the picture rate PR as described above. It should be noted that the non-integer pr is expressed as follows. For a PR value of 1, 4 or 7, the picture rate pr is 24000/1001, 30000/1001 or 60000/1001 respectively.

Since VD $[P_2]$ and VD $[P_1]$ have the rounding errors E2 and $E_1$ respectively whereas the bit rate br includes a rounding error up to 400 bps, the number of pictures (n) is obtained as a range of values. Since n must be an integer, however, possible values of n are limited to a number of candidates which may vary to a certain degree. At the step S52, candidates for the number of pictures (n) are found.

The flow of the processing then goes on to a step S53 at which the bit rate inferring unit 26 finds the bit rate R, strictly speaking, candidates for the inferred value of the bit rate, from the candidates for the number of pictures (n) found at the step S52.

A candidate for the bit rate R can be found by using the following equation which is derived by substitution of R for br of Eq. (8) and then rearranging the result of substitution so as to put R on the left hand side or the equal symbol "=" of the equation.

$$R=BC[P_1, P_2]/(n/pr-(dVD[P_2, P_1]+E_{2-1})/90000) \quad (9)$$

where notations dVD $[P_2, P_1]$ and $E_{2-1}$ used in Eq. (9) represent (VD $[P_2]$–VD $[P_1]$) and (E2–E1) respectively.

Since a plurality of candidates for the number of pictures (n) exist as described above, there are also resulted in a plurality of candidates for the bit rate R. In addition, since dVD $[P_2, P_1]$ has a rounding error, the number of candidates for the bit rate R is greater than the number of candidates for the number of pictures (n). Obtained by multiplying BR by 400, however, the bit rate R is a value in the range of (br–399) to br. Thus, possible values of the bit rate R are limited to a number of candidates which may vary to a certain degree. At the step S53, candidates for the bit rate R are found. It should be noted that the limitation on the number of candidates for the bit rate R further limits the number of candidates for the number of pictures (n).

After candidates for the number of pictures (n) and candidates for the bit rate R have been found as described above, the flow of the processing goes on to a step S54 at which a pair comprising a number of pictures (n) and a bit rate R that seem most likely correct are selected from the candidates.

To put it in detail, at the step S54, first of all, a third point $P_3$ other than the points $P_1$ and $P_2$ is set on the bit stream. The VBV delay VD $[P_3]$ at the point $P_3$ can be found from Eq. (10) as follows:

$$VD[P_3]=INT(VD[P_1]+E1+90000\times(n/pr-BC[P_1, P_3]/R)) \quad (10)$$

where notation BC $[P_1, P_3]$ used in Eq. (10) is the amount of data between the points $P_1$ and $P_3$ found in the same way as the one shown in FIG. 10.

At the step S54, a candidate for the number of pictures (n) and a candidate for the bit rate R found at the steps S52 and S53 respectively are substituted for n and R in the expression on the right hand side of Eq. (10) to compute VD $[P_3]$ on the left hand side which is then compared with the actual VBV delay at the point $P_3$ on the bit stream which can be found by using Eq. 6. A pair of candidates are substituted on a trial-and-error basis until the difference between VD $[P_3]$ on the left hand side of Eq. (10) and the actual VBV delay at the point $P_3$ on the bit stream approaches 0. In this way, a pair comprising a number of pictures (n) and a bit rate R that seem most likely correct can be found.

Then, the flow of the processing goes on to a step S55 to find such a number of pictures (N) from the bit rate R that an error between the bit rate R found at the step S54 and the true bit rate r has a value small enough so as to fall within a predetermined range.

The following is calculation of N for a typical case. First of all, substitution of the true bit rate r for the bit rate br in Eq. (8) yields Eq. (11) given as follows:

$$n=((VD[P_2]-VD[P1]+E2-E1)/90000+BC[P_1, P_2]/r)\times pr$$

$$=(dVD[P_2, P_1]/90000+E_2-1/90000+BC[P_1, P_2]/r)\times pr \quad (11)$$

By assuming dVD $[P_2, P_1]=0$, Eq. (11) can be changed to Eq. (12) given below:

$$n=(E_{2-1}/90000+BC[P_1, P_2]/r)\times pr \quad (12)$$

On the other hand, the amount of data BC $[P_1, P_2]$ can be expressed in terms of the inferred value R of the bit rate by Eq. (13) as follows:

$$BC[P_1, P_2]=n/pr\times R \quad (13)$$

Substitution of the expression on the right hand side of Eq. (13) for BC $[P_1, P_2]$ in Eq. (12) yields Eq. (14) given below:

$$n=(E_{2-1}/90000+(n/pr\times R)/r)\times pr$$

$$=r\times E_{2-1}/(r-R)\times 90000\times pr \quad (14)$$

Since $|E_{2-1}|$ has a value smaller than 1, the maximum value of n is expressed by Eq. (15) as follows:

$$n=r/(r-R)\times 90000\times pr \quad (15)$$

In the case of a picture of the NTSC system, for example, Eq. (15) can be rewritten as follows:

$$n=r/((r-R)\times 3003.0) \quad (16)$$

In order to make the error of the inferred value R of the bit rate, that is, (r–R), equal to or smaller than 1 bps, the number of pictures (n) is found to be r/3003.

In the above calculation, dVD $[P_2, P_1]$ is assumed to be 0. If VD $[P_2]$ is not equal to VD $[P_1]$, that is, for example, VD $[P_2]$>VD $[P_i]$, however, it is necessary to set the points P2 and P1 at such positions that the number of pictures between the points $P_2$ and $P_1$ is at least dVD $[P_2, P_1]90000\times pr$.

Now, let notation r' represent a bit rate with an error. The following is consideration of the effect of the error included in the bit rate r' on the calculation of the VBV display VD [Aout] at the end point $A_{out}$ and the VBV display VD $[B_{in}]$ at the start point $B_{in}$. From Eq. (10), an equation for an error $E_{VBV}$ of the VBV display can derived as follows:

$$E_{VBV}=90000\times BC[P_1, P_2]\times(r'-r)/(r\times r') \quad (17)$$

Eq. (17) can be rewritten as follows:

$$BC[P_1, P_2]/r=E_{VBV}/(90000\times r')/(r40 -r)$$

The above equation is further simplified to Eq. (18) given below:

$$t=1/(r'-r)\times E_{VBV}/(90000\times r') \quad (18)$$

where t (=BC $[P_1, P_2]/r$) is a period of time between the points $P_1$ and $P_2$.

Since $E_{VBV}$ is rounded into an integer, the minimum value thereof is 1. Substitution of the minimum value for $E_{VBV}$ in Eq. (18) yields Eq. (19) given as follows:

$$t=1/(r'-r)\times r'/90000 \quad (19)$$

Eq. (19) indicates that an error of the inferred value R of the bit rate, that is, (r'–r), which is equal to or smaller than 1 bps will have an effect on the calculation of the VBV display VD only in the case of a period of time (t) equal to or smaller than the value of the expression on the right hand side of Eq. (20) given as follows:

$$t=r'/90000 \quad (20)$$

Thus, in the case of a video CD (compact disc) with a bit rate of the order of 1.15 Mbps, it is necessary to set the points $P_1$ and $P_2$ at such locations that the distance between the locations corresponds to at least about 12.8 seconds in order to result in a bit rate error of 1 bps. That is to say, it is necessary to set the points $P_1$ and $P_2$ at such locations that the distance between the locations corresponds to at least about 6.4 seconds or one half of 12.8 seconds in order to result in a bit rate error of 2 bps.

As a result, by setting the points $P_1$ and $P_2$ at locations separated away from each other by at least such a distance, the error of the inferred value of the bit rate R found at the step S54 is small enough so as to allow the error to be ignored.

If only the distance from the point $P_1$ to the point $P_2$ and the error of the bit rate are to be taken into consideration, the bit rate can be inferred in the way described above. It should be noted, however, that the rounding error of the VBV display VD $[P_1]$ in Eq. (10) used at the step S54 at the point $P_1$ exists and it is rather the effect of this error that is big.

At the step S55, the bit rate inferring unit 26 finds the number of pictures (N) corresponding to such a period of time that the error of the bit rate R found at the step S54 in the way described so far can be ignored.

The flow then goes on to a step S56 to form a judgment as to whether or not the number of pictures (n) between the points $P_1$ and $P_2$ found at the step S54 is equal to or greater than the number of pictures (N) found at the step S55. If the outcome of the judgment formed at the step S56 indicates that the number of pictures (n) is neither equal to nor greater than the number of pictures (N), the flow of the processing proceeds to a step S57 at which the points $P_1$ and $P_2$ are set again so that the number of pictures (n) between the points $P_1$ and $P_2$ is equal to or greater than the number of pictures (N) found at the step S55. The flow of the processing then returns to the step S52 to repeat the pieces of processing described so far.

If the outcome of the judgment formed at the step S56 indicates that n is equal to or greater than N, on the other hand, the inferred value of bit rate R found at the step S54 is supplied to the controller 24 and the processing is terminated.

The controller 24 uses the inferred value of the bit rate R to carry out the pieces of processing described above, that is, the processing to compute the amount of data to be accumulated in the VBV buffer carried out at the steps 22, 29 and 34 of the flowchart shown in FIGS. 4 to 6.

Since the bit rate is inferred with a high degree of accuracy as described above, the accuracy of the processing carried out by the controller 24 can also be improved as well.

As described above, the bit rate inferring unit 26 finds most likely correct candidates of the bit rate, that is, inferred values of the bit rate, for both the bit streams A and B and supplies the inferred values to the controller 24. The controller 24 typically computes the average value of apparently common candidates for the bit rates of the two bit streams A and B and uses the average value in the pieces of processing described above.

If there are no apparently common candidates for the bit rates of the two bit streams A and B or there is a clear difference in value between the candidates, the bit rates used in the operations to encode the bit streams A and B are judged to be different from each other from the beginning. In such a case, since editing work conforming to the MPEG1 specifications can not be carried out, the edit processing is stopped.

As described above, the present invention is applied to a picture editing apparatus for editing bit streams obtained from encoding operations conforming to the MPEG1 specifications. It should be noted, however, that the description is not intended to be construed in a limiting sense. That is to say, the scope of the present invention is not limited to bit streams obtained from encoding operations conforming to the MPEG1 specifications. For example, the present invention can also be applied to a picture editing apparatus for editing bit streams obtained from encoding operations conforming to the MPEG2 specifications or encoding operations which are carried out by assuming that a virtual buffer is used on the receiving side.

In addition, the present invention can also be applied to an information editing apparatus for editing bit streams which include sound in addition to pictures.

According to the picture editing apparatus of the present invention, an amount of data to be accumulated in a virtual buffer at a 1st point of junction on a 1st bit stream for connecting the 1st bit stream to a 2nd bit stream and an amount of data to be accumulated in the virtual buffer at a 2nd point of junction on the 2nd bit stream for connecting the 2nd bit stream to the 1st bit stream are computed by using accumulation quantity information; and an amount of data at a portion of a 3rd bit stream corresponding to a point of junction between the 1st and 2nd bit streams is adjusted in accordance with a difference between the amounts of data to be accumulated in the virtual buffer at the 1st and 2nd points of junction.

As a result, bit streams completing a compression and encoding process can be edited as they are at a high processing speed.

What is claimed is:

1. A picture editing apparatus for concatenating at least a portion of a first bit stream obtained as a result of an operation to compress and encode pictures with at least a portion of a second bit stream also obtained as a result of said operation to compress and encode pictures, thereby composing a third bit stream through editing said first and second bit streams, wherein said operation to compress and encode pictures is carried out by considering an amount of data to be accumulated in a virtual buffer on a receiving side, and wherein accumulation quantity information on said amount of data to be accumulated is included in said first and second bit streams. said picture editing apparatus comprising:

data accumulation quantity computing means for computing an amount of data to be accumulated in said virtual buffer at a first point of junction on said first bit stream for connecting said first bit stream to said second bit stream and for computing an amount of data to be accumulated in said virtual buffer at a second point of junction on said second bit stream for connecting said second bit stream to said first bit stream by using said accumulation quantity information; and data quantity adjusting means for adjusting an amount of data at a portion of said third bit stream corresponding to a point of junction between said first and second bit streams in accordance with a difference between said amounts of data to be accumulated in said virtual buffer at said first and second points of junction computed by said data accumulation quantity computing means, wherein said first and second bit streams are each a result of said operation to compress and encode pictures at least conforming to MPEG (Moving Picture Expert Group) specifications, wherein said accumulation quantity information is a VD (Video Buffering Verifier Delay) which is included in a picture header and corresponds to said amount of data to be accumulated, wherein said virtual buffer is a VBV (Video Buffering Verifier) buffer, and wherein said data quantity adjusting means inserts data of a skipped P picture to a location following data of a picture at said first point of junction if said amount of data to be accumulated in said VBV buffer at said first point of junction is smaller than said amount of data to be accumulated in said VBV buffer at said second point of junction.

2. A picture editing apparatus according to claim 1 wherein:

said data quantity adjusting means inserts a stuffing code into data of a picture at said first point of junction if said amount of data to be accumulated in said VBV buffer at said first point of junction is greater than said amount of data to be accumulated in said VBV buffer at said second point of junction.

3. A picture editing apparatus according to claim 2 wherein:

said data quantity adjusting means inserts said stuffing code into data of said picture at said first point of junction so that said amounts of data to be accumulated in said VBV buffer at said first and second points of junction become equal to each other.

4. A picture editing apparatus according to claim 1 wherein:

said data quantity adjusting means inserts said data of said skipped P picture so that said amount of data to be accumulated in said VBV buffer at said first point of junction after insertion of said data of said skipped P picture becomes equal to or greater than said amount of data to be accumulated in said VBV buffer at said second point of junction.

5. A picture editing apparatus according to claim 4 wherein:

if said amount of data to be accumulated in said VBV buffer at said first point of junction after insertion of said data of said skipped P picture becomes greater than said amount of data to be accumulated in said VBV buffer at said second point of junction, a stuffing code is inserted so that said amounts of data to be accumulated in said VBV buffer at said first and second points of junction become equal to each other.

6. A picture editing apparatus according to claim 1, further comprising:

bit rate inferring means for inferring bit rates of said first and second bit streams;

wherein said data accumulation quantity computing means computes said amount of data to be accumulated in said VBV buffer from said bit rates inferred by said bit rate inferring means and said accumulation quantity information.

7. A picture editing method of concatenating at least a portion of a first bit stream obtained as a result of an operation to compress and encode pictures with at least a portion of a second bit stream also obtained as a result of said operation to compress and encode pictures, thereby composing a third bit stream through editing said first and second bit streams, wherein said operation to compress and encode pictures is carried out by considering an amount of data to be accumulated in a virtual buffer on a receiving side, and wherein accumulation quantity information on said amount of data to be accumulated in said virtual buffer is included in said first and second bit streams, said picture editing method comprising the steps of:

computing an amount of data to be accumulated in said virtual buffer at a first point of junction on said first bit stream for connecting said first bit stream to said second bit stream and computing an amount of data to be accumulated in said virtual buffer at a second point of junction on said second bit stream for connecting said second bit stream to said first bit stream by using said accumulation quantity information; and adjusting an amount of data at a portion of said third bit stream corresponding to a point of junction between said first and second bit streams in accordance with a difference between said amounts of data to be accumulated in said virtual buffer at said first and second points of junction, wherein said first and second bit streams are each a result of said operation to compress and encode pictures at least conforming to MPEG (Moving Picture Expert Group) specifications, wherein said accumulation quantity information is a VD (Video Buffering Verifier Delay) which is included in a picture header and corresponds to said amount of data to be accumulated, wherein said virtual buffer is a VBV (Video Buffering Verifier) buffer, and wherein said step of adjusting comprises inserting data of skipped P picture to a location following data of a picture at said first point of junction if said amount of data to be accumulated in said VBV buffer at said first point of junction is smaller than said amount of data to be accumulate in said VBV buffer at said second point of junction.

* * * * *